United States Patent
Seyffer et al.

(10) Patent No.: US 10,837,140 B2
(45) Date of Patent: Nov. 17, 2020

(54) USE OF A COATING LAYER WITH A STYRENE-BUTADIENE COPOLYMER ON A PAPER SUBSTRATE FOR BLOCKING OXYGEN TRANSFER

(71) Applicant: BASF SE, Ludwigshafen (DE)

(72) Inventors: Hermann Seyffer, Heidelberg (DE); Carmen-Elena Cimpeanu, Ludwigshafen (DE); Theo Smit, Heidelberg (DE); Nico Veling, Heidelberg (DE); Juergen Schmidt-Thuemmes, Neuhofen (DE); Dirk Lawrenz, Hassloch (DE); Rainer Blum, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 337 days.

(21) Appl. No.: 15/574,714

(22) PCT Filed: May 13, 2016

(86) PCT No.: PCT/EP2016/060850
§ 371 (c)(1),
(2) Date: Nov. 16, 2017

(87) PCT Pub. No.: WO2016/184808
PCT Pub. Date: Nov. 24, 2016

(65) Prior Publication Data
US 2018/0135250 A1   May 17, 2018

(30) Foreign Application Priority Data

May 18, 2015 (EP) .................................... 15168017
May 26, 2015 (EP) .................................... 15169185

(51) Int. Cl.

| | | |
|---|---|---|
| *D21H 19/12* | (2006.01) | |
| *D21H 27/10* | (2006.01) | |
| *C09D 109/06* | (2006.01) | |
| *D21H 19/22* | (2006.01) | |
| *D21H 19/54* | (2006.01) | |
| *C09D 125/10* | (2006.01) | |
| *D21H 27/18* | (2006.01) | |
| *D21H 19/20* | (2006.01) | |
| *C08F 212/08* | (2006.01) | |
| *D21H 19/60* | (2006.01) | |
| *D21H 19/62* | (2006.01) | |
| *D21J 1/08* | (2006.01) | |

(Continued)

(52) U.S. Cl.
CPC .......... *D21H 19/12* (2013.01); *C08F 212/08* (2013.01); *C09D 109/06* (2013.01); *C09D 125/10* (2013.01); *D21H 19/20* (2013.01); *D21H 19/22* (2013.01); *D21H 19/54* (2013.01); *D21H 19/60* (2013.01); *D21H 19/62* (2013.01); *D21H 27/10* (2013.01); *D21H 27/18* (2013.01); *D21J 1/08* (2013.01); *B05D 1/28* (2013.01); *B05D 3/0272* (2013.01); *C08F 236/10* (2013.01); *C08F 2400/00* (2013.01); *C08F 2800/20* (2013.01); *C08K 2003/265* (2013.01)

(58) Field of Classification Search
CPC ........ D21H 19/12; D21H 27/10; D21H 19/22; D21H 19/54; D21H 27/18; D21H 19/20; D21H 19/60; D21H 19/62; C09D 125/10; C09D 109/06; C08F 212/08; C08F 236/10; C08F 2400/00; C08F 2800/20; D21J 1/08; B05D 1/28; B05D 3/0272; C08K 2003/265
See application file for complete search history.

(56) References Cited

U.S. PATENT DOCUMENTS

| | | |
|---|---|---|
| 4,269,749 A | 5/1981 | Marriott et al. |
| 4,908,240 A | 3/1990 | Auhorn et al. |

FOREIGN PATENT DOCUMENTS

| | | |
|---|---|---|
| DE | 41 33 193 A1 | 4/1993 |
| WO | WO 2011/157679 A | 12/2011 |

(Continued)

OTHER PUBLICATIONS

International Search Report and Written Opinion for PCT application PCT/EP2016/060850 dated Nov. 16, 2017 (8 pages).

*Primary Examiner* — Michael C Miggins
(74) *Attorney, Agent, or Firm* — Foley & Lardner LLP

(57) ABSTRACT

The invention relates to a use of a coating layer on a paper substrate for blocking oxygen transfer through the coated paper substrate, wherein the coating layer on the paper substrate is obtainable by a process, which comprises the steps of (a) providing a paper substrate with a surface, (b) applying onto the surface of the provided paper substrate an aqueous coating mass, and (c) drying of the paper substrate with the applied aqueous coating mass to obtain the coated paper substrate, wherein the aqueous coating mass contains an aqueous dispersion of a copolymer P, which is obtainable by radically initiated emulsion polymerization of at least 40 parts by weight of styrene and 22 to 49 parts by weight of butadiene and optionally other monomers based on the sum total of the parts by weight of all monomers, which is always 100, in the presence of a first degraded starch. It relates further to a coated paper substrate obtainable with a coating mass comprising the aqueous dispersion of the copolymer P and a further saccharide, which is added after the polymerization of the monomers. It relates also to a process for manufacturing the coated paper substrate obtainable with a coating mass comprising the aqueous dispersion of the copolymer P and the further saccharide.

21 Claims, No Drawings

(51) Int. Cl.
  *C08F 236/10* (2006.01)
  *B05D 1/28* (2006.01)
  *B05D 3/02* (2006.01)
  *C08K 3/26* (2006.01)

(56) References Cited

FOREIGN PATENT DOCUMENTS

| WO | WO-2013/053840 A  | 4/2013 |
| WO | WO-2013/068363 A1 | 5/2013 |
| WO | WO-2013/083504    | 6/2013 |

USE OF A COATING LAYER WITH A STYRENE-BUTADIENE COPOLYMER ON A PAPER SUBSTRATE FOR BLOCKING OXYGEN TRANSFER

CROSS-REFERENCE TO RELATED APPLICATIONS

This application is a U.S. National Phase Application under 35 U.S.C. § 371 of International Application No. PCT/EP2016/060850, filed on May 13, 2016, which claims benefit of priority to EP Application No. 15168017.0, filed on May 18, 2015, and to EP Application No. 15169185.4, filed on May 26, 2015, the entire contents of which are incorporated herein by reference in their entireties.

DESCRIPTION

The current invention relates to a use of a coating layer on a paper substrate for blocking oxygen transfer through the coated paper substrate, wherein the coating layer is obtainable with a coating mass comprising an aqueous dispersion of a copolymer P, whose monomers, which comprise styrene and butadiene, are polymerized in the presence of a first degraded starch. It relates further to a coated paper substrate obtainable with a coating mass comprising an aqueous dispersion of a copolymer P, whose monomers, which comprise styrene and butadiene, are polymerized in the presence of a first degraded starch, and a further saccharide, which is added after the polymerization of the monomers. It relates further to a process for manufacturing a coated paper substrate obtainable with a coating mass comprising an aqueous dispersion of a copolymer P, whose monomers, which comprise a styrene and butadiene, are polymerized in the presence of a first degraded starch, and a further saccharide, which is added after the polymerization of the monomers.

Products sensitive to oxygen, particularly foods, beverages and medicines, deteriorate or spoil in the presence of oxygen. One approach to reducing these difficulties is to package such products with packaging materials containing at least one layer of a barrier film that can act as a barrier to transmission of oxygen. Paper and cardboard are ecologically friendly materials, since they are based on renewable raw materials. They are regularly used as packaging material.

WO 2011/157679 A discloses an aqueous polymer dispersion obtainable by free-radically initiated emulsion polymerization of
(a) 19.9 to 80 parts by weight of at least one vinylaromatic compound,
(b) 19.9 to 80 parts by weight of at least one acrylate monomer selected from $C_1$-$C_{10}$ alkyl acrylates and $C_1$-$C_{10}$ alkyl methacrylates,
(c) 0.1 to 10 parts by weight of at least one ethylenically unsaturated acid, and
(d) 0 to 20 parts by weight of at least one other ethylenically unsaturated monomer,
wherein the sum total of the parts by weight of monomers (a), (b), (c) and (d) is 100, and wherein the emulsion polymerization is effected in an aqueous medium in the presence of free-radical initiators, seed latex and also at least one carbohydrate compound in the form of a degraded starch. No statement is provided in regard to a blocking of a gas transfer.

WO 2013/053840 A discloses a finely divided, starch-containing polymer dispersion which is obtainable by free radical emulsion polymerization of ethylenically unsaturated monomers in the presence of at least one redox initiator and starch, wherein
(a) from 0 to less than 40% by weight of at least one optionally substituted styrene,
(b) from greater than 60 to 100% by weight of at least one $C_1$-$C_{12}$-alkyl acrylate and/or $C_1$-$C_{12}$-alkyl methacrylate,
(c) from 0 to 10% by weight of at least one other ethylenically unsaturated copolymerizable monomer,
are used as the ethylenically unsaturated monomers, the sum (a)+(b)+(c) being 100% and being based on the active monomer content and
(d) from 15 to 40% by weight of at least one degraded starch which has a molar mass $M_w$ of from 1000 to 65 000 g/mol, based on the total weight of solids content of components (a)+(b)+(c)+(d),
is used as the starch, and the polymerization being carried out in the presence of at least 0.01% by weight, based on the monomers used, of at least one chain-transfer agent. No statement is provided in regard to a blocking of a gas transfer.

WO 2013/083504 discloses a paper or cardboard packaging produced at least partly from mineral oil contaminated (e.g. recycled) paper, wherein the packaging includes at least one barrier layer obtainable by applying an aqueous polymer dispersion comprising at least one copolymer obtainable by emulsion polymerization of
(a) one or more principal monomers selected from the group consisting of $C_1$-$C_4$ alkyl (meth)acrylates,
(b) 0.1 to 5 wt % of one or more acid monomers, e.g., selected from acrylic acid and methacrylic acid,
(c) 0-20 wt % of acrylonitrile and
(d) 0 to 10 wt % of further monomers other than the monomers (a) to (c),
wherein the glass transition temperature of the copolymer is in the range from +10 to +45° C., the emulsion polymerization is carried out in an aqueous medium in the presence of at least one carbohydrate compound and the barrier layer may be situated on one or more of the surfaces of the packaging, or the barrier layer may form at least one of multiple layers of a multilayered packaging coating or the barrier layer may be situated as a coating on at least one side of an inner bag situated within the packaging. A target is a packaging, which offers protection against packaged products becoming impaired by volatile organic compounds passing through the packaging, or which is endowed with an aroma barrier.

There is a general need for substrates suitable for packaging, which possess the property of blocking oxygen transfer through the substrate. This blocking does not have to be an absolute and relatively long-lasting blocking of an oxygen transfer as it would be provided by a metallic sheet. Instead, the blocking of oxygen transfer should be adapted to the foreseen use as for example for packaging of sensitive goods for a certain time period until their consumption.

It is an object of the present invention to provide a coating for a paper substrate, which provides blocking of oxygen transfer through the coated paper substrate. A simple manufacturing process, e.g. with few process steps, with few parameters to be controlled during the process, with few ingredients to be handled and/or with few, in particular no toxic ingredient in view of for example food packaging, is a further target resulting in additional advantages.

The object is achieved, according to the invention, by a use of a coating layer on a paper substrate for blocking oxygen transfer through the coated paper substrate, wherein the coating layer on the paper substrate is obtainable by a process, which comprises the steps of
(a) providing a paper substrate with a surface,
(b) applying onto the surface of the provided paper substrate an aqueous coating mass, and
(c) drying of the paper substrate with the applied aqueous coating mass to obtain the coated paper substrate,
wherein the aqueous coating mass contains an aqueous dispersion of a copolymer P, which is obtainable by radically initiated emulsion polymerization of
(i) 22 to 49 parts by weight of butadiene
(ii) at least 40 parts by weight of styrene
(iii) 0 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100,
in the presence of a first degraded starch.

An amount of a weight herein refers to the solids content, if not otherwise stated. The solids content is herein defined as the weight obtained when a defined amount, for example 5 g, is dried at 140° C. in a drying cabinet to a constant weight.

An ethylenically unsaturated group herein defines a $C_2$-unit, wherein the two carbon atoms are connected by a carbon-carbon-double bond. For example, in case of a complete substitution with hydrogen atoms, it is ethylene. In case of substitution with 3 hydrogen atoms, it is a vinyl group. In case of substitution with 2 hydrogen atoms, it is an ethen-1,2-diylgroup or an ethen-1,1-diylgroup.

Parts by weight based on the sum total parts by weight of the monomers (i), (ii), (iii), (iv), (v) and (vi) is also known as parts per hundred parts of monomers, since the sum total of the parts by weight of the monomers (i), (ii), (iii), (iv), (v) and (vi) is always 100. For example, 90 parts by weight of the first degraded starch and 300 parts by weight of the monomers in a specific aqueous dispersion of a copolymer P transforms to 30 parts by weight of the first degraded starch based on the sum total parts by weight of the monomers (i), (ii), (iii), (iv), (v) and (vi).

A rather planar and thin substrate, e.g. a material foreseen for packaging, which comprises in a relevant amount physical channels from one side to the opposite side of a certain diameter, e.g. holes, allows the transfer of any gas through the substrate. For improving the gas transfer characteristics of the substrate, an approach is the application of a coating to obtain a coated substrate. In case of otherwise comparable testing conditions, e.g. a comparable thickness of the coated substrate, a comparable temperature at the test, a comparable testing time period, etc., the blocking of a transfer of a gas through the coated substrate depends on the chemical type of the gas.

Some tests for blocking oxygen transfer through a substrate are based on a test cell, where one side of the substrate is in contact with pure oxygen and the opposite side is in contact with a carrier gas, mostly pure nitrogen, which streams over the opposite side of the substrate. The streaming carrier gas transports migrated oxygen to a detector device. This test principle has some consequences: the streaming gas may overestimate little channels through the substrate, create an underpressure at the opposite side and thereby pulls oxygen from the one side through the channels. For example, a cardboard box is mostly stored without a pressure difference and without a streaming gas. For this reason, a method for determining oxygen transfer is used herein, which represents more to the situation at a cardboard box employed under non-streaming conditions. At the method, a permeation cell is employed as a test chamber, wherein its open side to the surrounding atmosphere, i.e. air, is covered by the paper substrate, which is to be tested. Due to a sensitive detection method for oxygen, which is based on fluorescence decay in the presence of oxygen and which does further not consume oxygen for the measurement, an increase of oxygen content in the permeation cell can be monitored.

The obtained test values are stated as an oxygen permeability permeation rate in $cm^3$ oxygen per square meter and per day [oxygen $cm^3/(m^2\ d)$] with direct test values measured against air with around 20% oxygen content. Accordingly, a conversion to pure oxygen and a conversion to a specific permeability based on a standardized thickness are not conducted. The test values refer to a coating mass weight of 15 $g/m^2$ based on solids content of the coating mass applied to the paper substrate.

Preferred is a use, wherein the oxygen transfer is blocked to an oxygen permeability rate of lower than 85 $cm^3$ oxygen per square meter and per day, which is measured against air with around 20% oxygen content at a coated paper substrate with an applied amount of aqueous coating mass, which leads to a solids content of 15 $g/m^2$. In particular, the oxygen transfer is blocked to an oxygen permeability rate of lower than 40 $cm^3$ oxygen, very particular of lower than 15 $cm^3$ oxygen, especially of lower than 9 $cm^3$ oxygen, very especially lower than 5 $cm^3$ oxygen and most especially lower than 3 $cm^3$ oxygen.

Preferred is a use, wherein the oxygen transfer is blocked to an oxygen permeability rate of lower than 85 $cm^3$ oxygen per square meter and per day, which is measured against air with around 20% oxygen content at a coated paper substrate with an applied amount of aqueous coating mass, which leads to a solids content of 15 $g/m^2$, and at a temperature of 23° C. and 50% relative humidity of the air. In particular, the oxygen transfer is blocked to an oxygen permeability rate of lower than 40 $cm^3$ oxygen, very particular of lower than 15 $cm^3$ oxygen, especially of lower than 9 $cm^3$ oxygen, very especially lower than 5 $cm^3$ oxygen and most especially lower than 3 $cm^3$ oxygen. Preferably, the air at the determination of the oxygen permeability rate possesses an atmospheric pressure between 80 kPa and 120 kPa, in particular 101.32 kPa.

Preferred is a use, wherein the oxygen transfer is blocked to an oxygen permeability rate, wherein the ratio between the oxygen permeability rate of the coated paper substrate and the oxygen permeability rate of the paper substrate is larger than 25, in particular larger than 118, very particular larger than in 250 and especially larger than 1000, wherein both rates are measured against air with around 20% oxygen content and the difference between the paper substrate and the coated paper substrate is an applied aqueous coating mass, which leads to a solids content of 15 $g/m^2$.

Preferred is a use, wherein the oxygen transfer is blocked to an oxygen permeability rate, wherein the ratio between the oxygen permeability rate of the coated paper substrate and the oxygen permeability rate of the paper substrate is larger than 25, in particular larger than 118, very particular larger than in 250 and especially larger than 1000, wherein both rates are measured against air with around 20% oxygen content, at a temperature of 23° C. and at 50% relative humidity of the air and the difference between the paper substrate and the coated paper substrate is an applied aqueous coating mass, which leads to a solids content of 15 g/m². Preferably, the air at the determination of the oxygen permeability rates possesses an atmospheric pressure between 80 kPa and 120 kPa, in particular 101.32 kPa.

Preferred is a use, wherein the oxygen is a part of air.

Preferred is a use, wherein the oxygen is a part of air, which is gaseous.

Preferred is a use, wherein the oxygen is a part of air and the atmospheric pressure of the air is between 80 kPa and 120 kPa, in particular between 90 kPa and 110 kPa.

Preferred is a use, wherein the oxygen is a part of air and the temperature of the air is between −20° C. and 50° C., in particular between 0° C. and 45° C. and very particular between 4° C. and 35° C.

Preferred is a use, wherein the oxygen is a part of air, the atmospheric pressure of the air is between 80 kPa and 120 kPa, and the temperature of the air is between −20° C. and 50° C., in particular between 0° C. and 45° C. and very particular between 4° C. and 35° C.

Preferred is a use, wherein the oxygen is a part of air, the atmospheric pressure of the air is between 80 kPa and 120 kPa, the relative humidity of the air is between 0 and 90% at the actual temperature of the air and the temperature of the air is between −20° C. and 50° C., in particular between 0° C. and 45° C. and very particular between 4° C. and 35° C.

Preferred is a use, wherein the coated paper substrate is in an environment with a temperature between −20° C. and 50° C., in particular between 0° C. and 45° C. and very particular between 4° C. and 35° C.

Preferred is a use, wherein the coated paper substrate is in an environment with an atmospheric pressure between 80 kPa and 120 kPa, in particular between 90 kPa and 110 kPa.

Preferred is a use, wherein the coated paper substrate is in an environment with a humidity, which is similar to the relative humidity of air between 0% and 90% at the actual temperature of the environment, in particular between 10% and 80% and very particular between 20% and 70%.

Preferred is a use, wherein the coated paper substrate is in an environment with a temperature between −20° C. and 50° C., and with an atmospheric pressure between 80 kPa and 120 kPa.

Preferred is a use, wherein the coated paper substrate is in an environment with a temperature between −20° C. and 50° C., with an atmospheric pressure between 80 kPa and 120 kPa, and with a humidity, which is similar to the relative humidity of air between 0% and 90% at the actual temperature of the environment.

The radically initiated emulsion polymerization, which is also known as free-radical emulsion polymerization and which leads to an aqueous dispersion of the copolymer P, comprises the steps of providing the monomers, of emulsifying the monomers in an aqueous medium and of polymerizing the monomers in the presence of a free-radical initiator and the first degraded starch. The steps of providing the monomers, of emulsifying the monomers in an aqueous medium and of polymerizing the monomers in the presence of a free-radical initiator and the first degraded starch can be conducted in parallel. For example, parts or all of the monomers to be polymerized, i.e. monomers (i), (ii), (iii), (iv), (v) and (vi), are fed over a certain time to a reactor, where emulsification in an aqueous medium and polymerization already takes place.

The step of polymerizing the monomers in the presence of a free-radical initiator and the first degraded starch takes place preferably in a reactor. The medium for polymerizing the monomers in the presence of a free-radical initiator and the first degraded starch contains water and the aqueous medium for emulsifying the monomers forms typically at least a part of the medium for polymerizing the monomers in the presence of a free-radical initiator and the first degraded starch.

The monomers are emulsified during the radically initiated emulsion polymerization in an aqueous medium, i.e. they are dispersed in the aqueous medium supported for example by external stirring of the resulting mixture. The emulsifying of the monomers in an aqueous medium can take place in the same reactor, where the polymerizing occurs, or can be conducted in a separate apparatus with a subsequent transfer of the at least partly emulsified monomers to the reactor, where the polymerizing occurs. In the latter situation, the emulsification of the monomers continues in the reactor, where the polymerizing occurs. The monomers can also be fed already emulsified to the reactor, where the polymerizing occurs.

Preferably, the majority of the monomers is present in a liquid state at the process once polymerizing occurs.

The aqueous medium contains for example water, which is demineralized. The aqueous medium can contain a further solvent as diluent or to modify the solubility of the monomers. The further solvent is non-polymerizable under the applied process conditions, liquid at 23° C. and at 101.32 kPa, and is for example an alcohol such as methanol, ethanol, n-propanol or isopropanol, n-butanol or isobutanol, or a ketone such as acetone, methyl ethyl ketone, diethyl ketone or isobutyl methyl ketone. A mixture of further solvents is also suitable. Preferred is an aqueous medium, wherein the content of a further solvent is below 10% by weight based on the overall amount of water and the further solvent in the process, in particular below 1%.

A non-polymerizable component in the process is understood as a component, which does not act as a monomer for the copolymer P under the conditions of a radically initiated emulsion polymerization. Accordingly, even if the component is covalently incorporated into the copolymer P, the polymer chain growth is stopped by the component. In contrast, a monomer for the copolymer P enables after its covalent incorporation a further polymer chain growth, i.e. a reaction with a further monomer.

In order to promote the dispersing of the monomers in the aqueous medium, a dispersing auxiliary can be used. The dispersing auxiliary serves also to support the stabilization of the aqueous dispersion of the copolymer P by keeping the formed particles of the copolymer P dispersed. A dispersing auxiliary is an emulsifier, a protective colloid different to the first degraded starch or a mixture of both of them. The emulsifier and the protective colloid are differentiated by their weight-average molar mass $M_w$. An emulsifier has a weight-average molar mass $M_w$ in general below 2000, while the weight-average molar mass $M_w$ of the protective colloid may be up to 50 000, in particular from above 2000 to up to 50000. Preferably, the dispersing aid is an emulsifier.

A suitable emulsifier is a surface-active substance. An emulsifier is non-ionic, anionic, or cationic. In case of employing a mixture of emulsifiers, their compatibility has to assured, which can be evaluated in case of doubt by preliminary tests.

A non-ionic emulsifier is for example an ethoxylated $C_8$-$C_{36}$ fatty alcohol having a degree of ethoxylation of from 3 to 50 (=ethylene oxide units [EO]: 3-50), an ethoxylated mono-, di- and tri-$C_4$-$C_{12}$ alkylphenol having a degree of ethoxylation of from 3 to 50. A customary nonionic emulsifier is for example an Emulgin B grade (a cetyl/stearyl alcohol ethoxylate, RTM BASF), a Dehydrol LS grade (a fatty alcohol ethoxylate, EO units: 1-10, RTM BASF), a Lutensol A grade (a $C_{12}C_{14}$-fatty alcohol ethoxylate, EO units: 3-8, RTM BASF), a Lutensol AO grade (a $C_{13}C_{15}$-oxo alcohol ethoxylate, EO units: 3-30), a Lutensol AT grade (a $C_{16}C_{18}$-fatty alcohol ethoxylate, EO units: 11-80), a Lutensol ON grade (a $C_{10}$-oxo alcohol ethoxylate, EO units: 3-11) or a Lutensol TO grade (a $C_{13}$-oxo alcohol ethoxylate, EO units: 3-20).

An anionic emulsifier is for example an alkali metal salt of a dialkyl ester of sulfosuccinic acid, an alkali metal ion or ammonium salt of a $C_8$-$C_{12}$ alkyl sulfate, an alkali metal ion or ammonium salt of a $C_{12}$-$C_{18}$ alkylsulfonic acid, an alkali metal ion or ammonium salt of a $C_9$-$C_{18}$ alkylarylsulfonic acid, a sulfuric acid monoester of an ethoxylated $C_{12}$-$C_{18}$ alkanol (EO units: 4-30) or a sulfuric acid monoester of an ethoxylated ($C_4$-$C_{12}$ alkyl)phenol (EO units: 3-50).

As further anionic emulsifiers, compounds of the general formula I

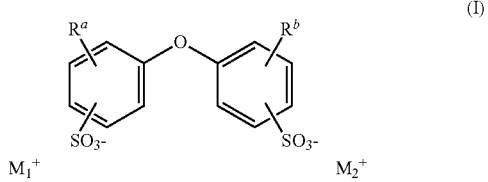

(I)

wherein $R^a$ and $R^b$ are each a H atom or $C_4$-$C_{24}$-alkyl and are not both H atoms at the same time, and $M_1^+$ and $M_2^+$ can be alkali metal ions and/or ammonium, are also useful. In the general formula I, $R^a$ and $R^b$ are preferably linear or branched alkyl radicals having from 6 to 18 carbon atoms, in particular 6, 12 or 16 carbon atoms, or hydrogen atoms, where $R^a$ and $R^b$ are not both hydrogen atoms at the same time. $M_1^+$ and $M_2^+$ are preferably sodium, potassium or ammonium, with sodium being particularly preferred. A compound of general formula I, in which $M_1^+$ and $M_2^+$ are both sodium, $R^a$ is a branched alkyl radical having 12 carbon atoms and $R^b$ is hydrogen or $R^a$ is particularly advantageous. Use is frequently made of industrial mixtures which have a proportion of from 50 to 90% by weight of the monoalkylated product, for example Dowfax® 2A1 (RTM The Dow Chemical Corp.). The compounds of general formula I are commonly known, e.g. from U.S. Pat. No. 4,269,749, and commercially available.

A comprehensive description of suitable emulsifiers may be found in Houben-Weyl, Methoden der organischen Chemie, volume XIV/1, Makromolekulare Stoffe, GeorgThieme-Verlag, Stuttgart, 1961, pages 192 to 208.

Similar to an emulsifier, a protective colloid is non-ionic, anionic or cationic. A protective colloid is for example a poly(vinyl alcohol), a poly(alkylene glycol), poly(acrylic acid) or an alkali metal salt thereof, a poly(methacrylic acid) or an alkali metal salt thereof, or a gelatin derivative. An anionic protective colloid can also be a copolymer, which is different to the copolymer P, containing at least one of acrylic acid, methacrylic acid, maleic acid, 2-acrylamido-2-methylpropane sulfonic acid, para-vinylphenyl sulfonic acid and salt forms thereof, preferably an alkali metal salt thereof, in polymerized form. A cationic protective colloid is for example a homopolymer or a copolymer, which is different to the polymer P, and the N-protonated or N-alkylated derivative of a homopolymer or a copolymer of N-vinylpyrrolidone, N-vinylformamide in its at least partly hydrolysed form, N-vinylacetamide in its at least partly hydrolysed form, N-vinylcarbazole, 1-vinylimidazole, 2-vinylimidazole, 2-vinylpyridine, 4-vinylpyridine or an amine-group-bearing acrylate, methacrylate, acrylamide or methacrylamide, wherein the nitrogen of the amine-group is protonated at a pH below 7 or is alkylated to be permanently cationically charged.

A comprehensive description of suitable protective colloids may be found in Houben-Weyl, Methoden der organischen Chemie, volume XIV/1, Makromolekulare Stoffe, Georg-Thieme-Verlag, Stuttgart, 1961, pages 411 to 420.

Preferred for the process for preparing an aqueous dispersion of a copolymer P is the presence of a dispersing aid, which is an emulsifier, in particular an anionic emulsifier and very particular an anionic emulsifier with a weight-average molar mass $M_w$ below 1000.

For polymerizing the monomers in the presence of a free-radical initiator and the first degraded starch, the aqueous medium, which can comprise a protective colloid different to the first degraded starch and/or an emulsifier in dissolved form and optionally a polymer seed, is preferably heated to the temperature at which the polymerization of the monomers is to take place or to a temperature which is, for example, from 5 to 20° C. below the polymerization temperature. The free-radical initiator can be fed in parallel to the monomers or for example parts of the free-radical initiator are added initially at once, for example 15% or 30% by weight of the overall amount of the free-radical initiator. For example, as soon as the polymerization temperature desired is reached or within a time span of from 1 to 15 minutes, preferably from 5 to 15 minutes, after the polymerization temperature is reached, the metering of the monomers to be polymerized is started. They can be fed continuously within, for example, from 60 minutes to 10 hours, in general within from 2 to 4 hours. It is also possible for example for 1% to 10% by weight of all or parts of the monomers to be included in the initial charge in addition to the free-radical initiator and the optional polymer seed. The remaining monomers and the remaining initiator are then metered separately into the initial charge under polymerization conditions after the polymerization has started.

The temperature for polymerizing the monomers in the presence of a free-radical initiator and the first degraded starch is chosen at least so high that the specifically employed free-radical initiator generates free radicals. Other criteria for the temperature might apply in addition. The temperature is for example from 50 to 130° C., in particular from 60 to 100° C. The polymerizing of the monomers can be carried out under a pressure, which is above atmospheric pressure, for example at pressures up to 15 bar, for example in the range from 2 to 10 bar.

The polymerizing of the monomers in the presence of a free-radical initiator and the first degraded starch can be conducted under exclusion of oxygen, for example under an inert atmosphere such as nitrogen. Additionally, other steps of the radically initiated emulsion polymerization can be conducted under exclusion of oxygen, especially the step of emulsifying the monomers in an aqueous medium.

A free-radical initiator forms free radicals under the reaction conditions used in the radically initiated emulsion polymerization. A free-radical initiator is for example a peroxodisulfate, a peroxosulfate, an azo initiator, an organic peroxide, an organic hydroperoxide, hydrogen peroxide or a redox initiator system, which consists of at least one reducing agent and an oxidizing agent. It is understood that the free radical initiator can also be a high-energy radiation such as electron beams or irradiation with UV light, which leads to transformation of process components into free radicals. A mixture of free radical initiators is also suitable. An example of a peroxodisulfate is sodium peroxodisulfate, potassium peroxodisulfate or ammonium peroxodisulfate. An example of a peroxosulfate is sodium peroxosulfate, potassium hydrogenperoxosulfate or potassium peroxosulfate. An example for an azo initiator is 2,2'-azobis(4-methoxy-2,4-dimethylvaleronitrile), 2,2'-azobis(2,4-dimethylvaleronitrile), 2,2'-azobis(2-amidinopropane) dihydrochloride, 2,2'-azobis(isobutyronitrile), 2,2'-azobis(2-methylbutyronitrile) or 2,2'-azobis(N,N'-dimethyleneisobutyramidine) dihydrochloride. An example for an organic peroxide is dibenzoyl peroxide, tert-butyl perpivalate, tert-butyl- per 2-ethylhexanoate, di-tert-butyl peroxide, diamyl peroxide, dioctanoyl peroxide, didecanoyl peroxide, dilauroyl peroxide, bis(o-toluyl) peroxide, succinyl peroxide, tert-butyl peracetate, tert-butyl permaleate, tert-butyl perisobutyrate, tert-butyl peroctanoate or tert-butyl perbenzoate. An example of an organic hydroperoxide is tert-butyl hydroperoxide. An example of a redox initiator system's oxidizing agent is the above mentioned free radical initiator with the exception of high-energy radiation. An example of a redox initiator's reducing agent is an alkali metal salt of sulfurous acid such as sodium sulfite or sodium hydrogen sulfite, an alkali metal salt of disulfurous acid such as sodium disulfite, an bisulfite adduct of an aliphatic aldehyde or ketone such as acetone bisulfite, hydroxymethanesulfinic acid and salts thereof or ascorbic acid. The redox initiator system can be used with concomitant use of a soluble metal compound, whose metallic component can occur in a plurality of valency states. An example for a redox initiator system is ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing agent, may also be a mixture such as a mixture of the sodium salt of hydroxymethanesulfinic acid and sodium disulfite.

The free-radical initiator is preferably used in the form of an aqueous solution, the lower concentration being determined by the amount of water acceptable in the dispersion and the upper concentration by the solubility of the relevant compound in water. Preferred is a water-soluble free-radical initiator, in particular sodium peroxosulfate, potassium peroxosulfate, ammonium peroxosulfate, sodium peroxodisulfate, potassium peroxodisulfate or ammonium peroxodisulfate, very particular sodium peroxodisulfate.

The free-radical initiator is used for example in an amount—unless it is high energy radiation—of up to 2% by weight, preferably of at least 0.1% by weight, in particular from 0.1 to 1.5% by weight based on the sum total parts by weight of the monomers (i), (ii), (iii), (iv), (v) and (vi).

In the radically initiated emulsion polymerization, the step of polymerizing the monomers in the presence of a free-radical initiator and the first degraded starch can be followed by a step of removing residual, unreacted monomers. The removal of residual, unreacted monomers is conducted until the desired residual amount of one or more of the employed monomers is achieved. The step of removal of residual, unreacted monomers can be for example an aftertreating of the polymerized monomers with a further radical initiator or an aftertreating of the aqueous dispersion of the copolymer P by distillation, for example steam distillation. At aftertreating of the polymerized monomers with a further radical initiator, the initially obtained reaction product is subjected to an aftertreatment after the actual polymerization with a further radical initiator. This further radical initiator can be the free-radical initiator of the step of polymerizing the monomers or a different free-radical initiator. Preferably, the further radical initiator generates non-ionic radicals, in particular hydroxyl radicals or alkoxy radicals. A hydroxyl radical is formed for example from hydrogen peroxide or an organic hydroperoxide. An alkoxy radical is formed for example from an organic alkyl peroxide. A further radical initiator, which forms non-ionic radicals, is for example hydrogen peroxide, dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluyl) peroxide, succinyl peroxide, tert-butyl peracetate, tert-butyl permaleate, tert-butyl perisobutyrate, tert-butyl per-n-octanoate, tert-butyl perbenzoate or tert-butyl hydroperoxide. A further radical initiator is preferably a peroxide compound, which is hydrogen peroxide, an organic hydroperoxide or an organic peroxide. Particularly preferred is a redox initiator system comprising the further radical initiator, which is a peroxide compound, which is hydrogen peroxide, an organic hydroperoxide or an organic peroxide, as oxidizing agent in combination with an inorganic or organic reducing agent. An inorganic or organic reducing agent is for example an alkali metal salt of sulfurous acid such as sodium sulfite or sodium hydrogen sulfite, an alkali metal salt of disulfurous acid such as sodium disulfite, a bisulfite adduct of an aliphatic aldehyde and a ketone such as an acetone bisulfite or a salt thereof or hydroxylmethanesulfinic acid or a salt thereof, or ascorbic acid. The redox initiator systems for the aftertreatment can be used with concomitant use of a soluble metal compound, whose metallic component may occur in a plurality of valency states. A redox initiator system for the aftertreatment is for example tert-butyl hydroperoxide/sodium disulfite, tert-butyl hydroperoxide/sodium hydroxymethanesulfinic acid or tert-butyl hydroperoxide/ascorbic acid. The redox initiator system's oxidizing agent or reducing agent may also be a mixture, for example a mixture of the sodium salt of hydroxymethanesulfinic acid and sodium disulfite. Especially preferred is a further radical initiator, which is a redox initiator system of hydrogen peroxide/ascorbic acid or of tert-butyl hydroperoxide/ascorbic acid.

The amount of a further radical initiator, which is used for the aftertreatment, is for example from 0.001 to 0.1 parts by weight, in particular from 0.002 to 0.5 parts by weight based on the sum total parts by weight of the monomers (i), (ii), (iii), (iv), (v) and (vi).

The addition of the further radical initiator for the aftertreatment is effected after the main polymerization of the monomers has taken place, i.e. after for example more than 70% by weight, in particular at least 90% by weight, very particularly 100% by weight, of all monomers have been added and more than 70% by weight, in particular at least 90% by weight, very particularly at least 95% of all monomers have undergone polymerization in the presence of a free-radical initiator. The aftertreatment with the further radical initiator is preferably effected at a temperature of at least 55° C., for example at 55 to 130° C., in particular of at least 65° C., for example at 65 to 95° C.

The radically initiated aqueous emulsion polymerization can also be conducted in the presence of a polymer seed. A polymer seed is an aqueous dispersion of finely divided polymer particles. The weight average particle diameter of the polymer particles of the polymer seed is for example not more than 80 nm, particularly not more than 60 nm, very particularly not more than 50 nm or not more than 40 nm, especially preferred in the range from 20 to 40 nm. Determining the weight average particle diameter is known to a person skilled in the art and is effected for example via the method of an analytical ultracentrifuge. Weight average particle diameter herein is the weight average $D_{w50}$ value determined by the method of the analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Maechtle, pages 147 to 175). It is advantageous for the polymer seed used to be monomodal and to have a narrow particle size distribution. Narrow particle size distribution herein is to be understood as meaning that the ratio of the weight average particle diameter $D_{w50}$ and number average particle diameter $D_{N50}$ determined by the method of the analytical ultracentrifuge [$D_{w50}/D_{N50}$] is not more than 2.0, preferably not more than 1.5 and more preferably not more than 1.2 or not more than 1.1. Preparing a polymer seed is known to a person skilled in the art and is typically effected by initially charging a relatively small amount of monomers and a relatively large amount of emulsifiers together with deionized water in a reaction vessel and adding a sufficient amount of polymerization initiator at the reaction temperature. Particular preference is given to a polystyrene polymer seed or to a poly(methyl methacrylate) polymer seed. The amount of the polymer seed is based on the solids content of the aqueous polymer seed dispersion. It is therefore reported as parts by weight of polymer seed solids based on the sum total of the parts by weight of the monomers (i), (ii), (iii), (iv), (v) and (vi). Preferably, a polymer seed is used in an amount of 0.1 to 4 parts by weight, more preferably 0.4 to 3 parts and especially 0.5 to 1 parts. The polymer seed can partly or completely be charged to the aqueous medium prior to addition of the monomers, with the remainder if any, being added in the course of polymerizing the monomers. Preferably, all of the polymer seed is initially charged to the aqueous medium prior to polymerizing the monomers.

Preferred is a use, wherein a polymer seed is present at the radically initiated emulsion polymerization of the monomers (i), (ii), (iii), (iv), (v) and (vi).

Preferred is a use, wherein a polymer seed is present at the radically initiated emulsion polymerization of the monomers (i), (ii), (iii), (iv), (v) and (vi), and the amount of polymer seed solids is in a range of 0.1 to 4 parts by weight based on the sum total of the parts by weight of the monomers (i), (ii), (iii), (iv), (v) and (vi).

In order to modify the properties of the resulting copolymer P, a chain transfer agent can be present during the radically initiated aqueous emulsion polymerization. In the presence of the chain transfer agent, a polymer which has a lower weight-averaged molar mass and a smaller K value is obtained in comparison to the polymer obtained in the absence of the chain transfer agent. The K value can be determined in 5% strength aqueous sodium chloride solution at pH 7, 25° C. and a polymer concentration of 0.1% by weight according to H. Fikentscher, Cellulose-Chemie, volume 13, 58-64 and 71-74 (1932). A chain transfer agent is for example a non-polymerizable sulfur-containing organic compound, which is free of a sulfur-oxygen-bond or wherein the sulfur atom is not part of a heterocylic ring, an aldehyde, which is free of a carbon-carbon double bond, a non-polymerizable carboxylic acid, a non-polymerizable alcohol or a non-polymerizable phosphor-containing compound. An example for a non-polymerizable sulfur-containing organic compound, which is free of a sulfur-oxygen-bond or wherein the sulfur atom is not part of a heterocylic ring, is dodecyl mercaptan, especially tert-dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid or thiourea. Dodecyl mercaptan is a member of the class of alkyl thiols. An example for an aldehyde, which is free of a carbon-carbon double bond, is formaldehyde, acetaldehyde or propionaldehyde. An example for a non-polymerizable carboxylic acid is formic acid or a salt thereof such as sodium formate or ammonium formate. An example for a non-polymerizable alcohol is isopropanol or 2-butanol. An example for a non-polymerizable phosphorous compound is sodium hypophosphite. A mixture of chain transfer agents is also suitable. Preferably, the chain transfer agent is dodecyl mercaptan. If a chain transfer agent is used in the radically initiated aqueous emulsion polymerization, the amount is typically 0.01 to 3 parts, preferably from 0.1 to 1.5 parts and very preferably from 0.3 to 1.0 parts by weight based on sum total of the parts by weight of the monomers (i), (ii), (iii), (iv), (v) and (vi). The chain transfer agent can be initially added to the aqueous medium prior to the monomers, metered into the polymerization together with or separately from the monomers during the radically initiated aqueous emulsion polymerization or portioned between these variants. Preferably, the chain transfer agent is metered with the monomers, in particular with styrene or butadiene.

Preferred is a use, wherein a chain transfer agent is present at the radically initiated emulsion polymerization of the monomers (i), (ii), (iii), (iv), (v) and (vi).

Preferred is a use, wherein a chain transfer agent is present at the radically initiated emulsion polymerization of the monomers (i), (ii), (iii), (iv), (v) and (vi), and the amount of the chain transfer agent is in a range of 0.01 to 3 parts by weight based on the sum total of the parts by weight of the monomers (i), (ii), (iii), (iv), (v) and (vi).

The pH value of the aqueous medium at the polymerizing of the monomers in the presence of a free-radical initiator and the first degraded starch is for example in the range from 1 to 7, in particular from 2 to 6. Monomers and other components in the radically initiated aqueous emulsion polymerization, which comprise acid groups, can be present in the radically initiated aqueous emulsion polymerization in the form of their free acids and in specific cases in an anhydride form, or partially or completely neutralized in a salt form depending on the pH value. Adjustments of the pH value of the aqueous medium are preferably conducted with an alkali metal hydroxide solution or ammonia solution. Preference is given to use aqueous sodium hydroxide solution, aqueous potassium hydroxide solution or ammonia solution as a neutralizing agent.

After the step of polymerizing the monomers in the presence of a free-radical initiator and the first degraded starch and the optional step of removing residual, unreacted monomers, the reaction product can be filtered to remove possible coagulum from the aqueous dispersion of the copolymer P.

At the end of the radically initiated emulsion polymerization, the pH value of the aqueous dispersion of the copolymer P can be adjusted, for example to a pH value of between 6 and 10, in particular between 6 and 8.

In the aqueous polymer dispersion of the copolymer P, the dispersed particles of the copolymer P have an average particle diameter of preferably 85 to 500 nm, in particular of 90 to 450 nm and especially of 100 to 350 nm. The average particle diameter of the polymer particles can be determined by dynamic light scattering on a 0.005% to 0.01% by weight aqueous polymer dispersion at 23° C. by means of an Autosizer IIC from Malvern Instruments, England and be based on the cumulant z-average diameter of the measured autocorrelation function as per ISO standard 13321.

A biocide can be added to the aqueous dispersion of a copolymer P to inhibit microbial activity. A biocide is for example 1,2-benzisothiazol-3(2H)-one, 2-methyl-4-isothiazolin-3-one or 5-chloro-2-methyl-4-isothiazolin-3-one. A mixture of biocides is also suitable.

The solids content of the aqueous dispersion of the copolymer P, which includes the first degraded starch, is for example in the range from 20% to 80%, in particular in the range from 40% to 60% by weight.

The aqueous coating mass is prepared for example by mixing the aqueous dispersion of the copolymer P with other optional components. An additional amount of further water can be added to adjust the concentration of the aqueous coating mass for an optimal coating step, for example to adjust the desired viscosity. Additional amounts of water can be introduced into the aqueous coating mass by aqueous formulations of other optional components. A solids content of the aqueous coating mass is typically in the range from 10% to 70% by weight based on the aqueous coating mass, in particular from 20% to 60% by weight and very particular from 40 to 60% by weight. A high solids content is desired to reduce the amount of water, which has to be removed at the step of drying the paper substrate with the applied aqueous coating mass. The pH of the aqueous coating mass is preferably adjusted to values of from 6 to 10, in particular from 7 to 9.5.

The aqueous coating mass is applied onto the surface of the provided paper substrate in general in an amount from 1 to 50 g, preferably from 5 to 30 g, in particular from 10 to 20 g, very particular 15 g, based on the solids content of the aqueous coating mass per square meter of the paper substrate. The aqueous coating mass can be applied by a customary application method, for example by means of a size press, a film press, a blade coater, an air brush, a knife coater, a curtain coater or a spray coater.

Drying of the paper substrate with the applied aqueous coating mass is conducted for example by heating the surface of the paper substrate, on which the aqueous coating mass is applied. A film formation is enabled by an evaporation of water and an optional further solvent. The surface temperature of the surface of the paper substrate with the applied aqueous coating mass during the drying step has to enable a film formation. Preferably, the surface temperature during the drying step reaches or exceeds the glass transition temperature of the dried aqueous dispersion of the copolymer P, which is polymerized in the presence of the first degraded starch. For a fast film formation, the temperature exceeds significantly the glass transition temperature, for example by at least 25° C. The heating is conducted for example by infrared irradiating. In the case of a continuous process, the paper substrate with the applied aqueous coating mass is for example led through a dryer duct, which is equipped with an infrared irradiating device. The thickness of the dried aqueous coating mass, i.e. the coating layer, is preferably at least 1 μm, in particular in the range from 1 to 50 μm, very particular in the range from range from 2 to 30 μm and especially in the range from 5 to 30 μm.

The first degraded starch is for example a degraded native starch or a degraded chemically modified starch. A native starch useful as a starting material for degradation is for example a starch from maize (corn), wheat, oats, barley, rice, millet, potato, peas, tapioca, sorghum or sago. A degraded starch has a reduced average molecular weight in comparison to the starting material, which has been degraded. Degradation of a starch can be effected enzymatically, oxidatively or through action of an acid or a base. Enzymatic degradation and degradation by action of an acid or a base involve often a hydrolysis, which leads to increased contents of oligosaccharides or dextrins in a degraded starch. Many degraded native starches are commercially available. Degradation of a starch is a chemical process, but chemical modification of a starch is herein differentiated from degradation by meaning a chemical modification, which targets the covalent addition of a chemical group to the starch. A degraded chemically modified starch results for example from esterification or etherification of a degraded native starch or from esterification or etherification of a native starch followed by degradation. The esterification can be supported by an inorganic or an organic acid, wherein the latter one can also be reacted in its anhydride or chloride forms. A common method to etherify a starch consists in treating the starch with an organic compound, which contains a reactive halogen atom, an epoxide functionality or a sulfate group in an aqueous alkaline solution. A known starch ether type is for example an alkyl ether, a hydroxyalkyl ether or a carboxyalkyl ether. A degraded and chemically modified starch is for example a phosphated or an acetylated degraded starch.

A way to characterize the degree of degradation of a degraded starch is the intrinsic viscosity $\eta i$, which is determined in accordance with DIN EN1628 at a temperature of 23° C. The intrinsic viscosity $\eta i$ of a degraded starch is preferably less than 0.07 dl/g, in particular in the range from 0.02 to 0.06 dl/g and for example less than 0.05 dl/g. An alternative way to characterize the degree of degradation of a starch is the DE value. DE denotes Dextrose Equivalent and refers to the percentage fraction of the dry substance which is attributable to reducing sugar. It corresponds to the amount of glucose (=dextrose) which would have the same reducing power per 100 g of dry substance. The DE value is a measure of how far polymer degradation of a starch has proceeded. Hence a product obtained having a low DE value retains a high proportion of polysaccharides and a low content of low molecular weight sugars, while a product of high DE value is mainly made up of just low molecular weight sugars only. Dependent on the degree of degradation, two types of a degraded starch are defined. A maltodextrin is a degraded starch with an intrinsic viscosity $\eta i$ in the range of 0.06 dl/g to not less than about 0.04 dl/g, a DE value of 3 to 20 and a weight-average molar mass $M_w$ in the range from 15 000 to 20 000 g/mol. A glucose syrup is a degraded starch with an intrinsic viscosity $\eta i$ in the range from 0.04 dl/g to 0.02 dl/g, a DE value in the range from 20 to 30 and weight-average molar mass $M_w$ in the range from 3000 to 6000 g/mol. Owing to their method of making, a maltodextrin or a glucose syrup is obtained in the form of an aqueous solution and both are also commercialized as such. An aqueous solution of a maltodextrin has for example a solids content of 50 to 70% by weight and an aqueous solution of a glucose syrup has for example a solids contents of 70 to 95%. Both can also be in a spray-dried form. Especially a maltodextrin is also available spray-dried in a powder form.

Preferred is a use, wherein the first degraded starch is a degraded native starch, in particular a native starch degraded to maltodextrin or to glucose syrup and very particular a native starch degraded to maltodextrin.

Preferred is a use, wherein the first degraded starch derivative is a degraded starch having an intrinsic viscosity ηi of less than 0.07 dl/g, in particular from 0.02 to 0.06 dl/g.

The first degraded starch is added at the process for example to the aqueous medium in the process. It is possible to firstly degrade, in particular enzymatically, a native starch in an aqueous solution. After the degradation, which can also be actively stopped, the aqueous solution containing the first degraded starch becomes at least partly the medium in which the polymerizing of the monomers occurs. Optionally, the starch derivative is partly or completely added to the aqueous medium for emulsifying the monomers. Preferably, 50% to 100% by weight of the first degraded starch, which is based on the overall amount of the first degraded starch, is present when polymerizing of the monomers in the presence of a free-radical initiator begins, in particular 80% to 100% by weight.

The content of the first degraded starch derivative is for example from 5 to 80 parts by weight, in particular from 15 to 60 parts, very particular from 20 to 50 parts by weight or especially from 25 to 40 parts by weight of the first degraded starch based on the sum total parts by weight of the monomers (i), (ii), (iii), (iv), (v) and (vi).

Preferred is a use, wherein the amount of the first degraded starch is from 5 to 80 parts by weight based on the sum total parts by weight of the monomers (i), (ii), (iii), (iv), (v) and (vi).

The aqueous dispersion of the copolymer P, which is polymerized in the presence of the first degraded starch, possesses a glass transition temperature once it is dried, for example when a film is formed. The glass transition temperature can be determined by differential scanning calorimetry, in particular the norm ISO 11357-2.

The Fox equation can be used for the calculation of the glass transition of a polymer, which is polymerized in the absence of the first degraded starch. After Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980), the reciprocal of the glass transition temperature of uncrosslinked or lightly crosslinked copolymers is given to a good approximation by:

$$1/T_9 = x^1/T_g^1 + x^2/T_g^2 + \ldots x^n/T_g^n,$$

where $x^1, x^2, \ldots x^n$ are the mass fractions of the monomers 1, 2, ... n constructing the polymers A and B and $T_g^1, T_g^2, \ldots T_g^n$ are the glass transition temperatures, in degrees Kelvin, of the homopolymers each constructed of only one of the monomers 1, 2, ... n. The mass fractions are based on the sum total of all monomers from which the polymers A and B of the polymer mixture are constructed. The $T_9$ values of the homopolymers of most monomers are known and listed for example in Ullmann's Encyclopedia of Industrial Chemistry, vol. 5, A21, page 169, VCH, Weinheim 1992, further sources of glass transition temperatures of homopolymers are for example J. Brandrup, E:H: Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. Accordingly, the Fox equation allows to find a starting point for choosing the monomers.

The glass transition temperatures of the dried aqueous polymer dispersions No. D1 to D3 as shown in the experimental part provide further starting points for choosing the monomers. They also indicate an influence caused by the presence of the first degraded starch during the polymerization.

Preferred is an use, wherein the monomers (i), (ii), (iii), (iv), (v) and (vi) are chosen in a way, that the dried aqueous dispersion of the copolymer P, which is polymerized in the presence of the first degraded starch, possesses a glass transition temperature below 40° C. as determined by the norm ISO 11357-2. In particular, the glass transition temperature is below 30° C., in particular in the range from −10° C. to 30° C., very particular in the range from −10° C. to 25° C. and especially from −5° C. to 15° C.

The upper limit for the amount of styrene is determined by the mandatory amounts of the monomers (ii), (iii), (iv), (v) and (vi), since the sum total of the parts by weight of the monomers (i), (ii), (iii), (iv), (v) and (vi) is always 100. For example, an upper limit is 78 parts by weight, in particular 70 parts by weight, very particular 65 parts by weight and very especially 62 parts by weight. Preferably, the amount of styrene is at least 45 parts by weight, wherein the sum total of the parts by weight of the monomers (i), (ii), (iii), (iv), (v) and (vi) is always 100. In particular, the amount of styrene is at least 50 parts by weight.

Preferred is a use, wherein the aqueous dispersion of the copolymer P is obtainable by radically initiated emulsion polymerization comprising (i) at least 45 parts by weight of styrene.

Preferably, the amount of butadiene is 30 to 45 parts by weight, in particular 35 to 42 parts by weight, wherein the sum total of the parts by weight of the monomers (i), (ii), (iii), (iv), (v) and (vi) is always 100.

Preferred is a use, wherein the aqueous dispersion of the copolymer P is obtainable by radically initiated emulsion polymerization comprising (ii) 30 to 45 parts by weight of butadiene.

The acidic monomer contains one ethylenically unsaturated group and at least one acid group. The acid group of the acidic monomer is for example a carboxylic acid group, a sulfonic acid group or a phosphonic acid group. Examples for the acidic monomer, which contains one ethylenically unsaturated group and at least one acid group, are acrylic acid, methacrylic acid, itaconic acid, crotonic acid (trans-butenoic acid), isocrotonic acid (cis-butenoic acid), vinylacetic acid, (E)-4-methoxy-4-oxo-but-2-enoic acid, (Z)-4-ethoxy-4-oxo-but-2-enoic acid, vinyllactic acid, maleic acid, 2-methylmaleic acid, aconitic acid, vinyl sulfonic acid, 2-acrylamido-2-methylpropane sulfonic acid, 3-sulfopropyl acrylate, 3-sulfopropyl methacrylate, para-vinylphenyl sulfonic acid, metavinyl sulfonic acid, ortho-vinylphenyl sulfonic acid or vinyl phosphonic acid. A mixture of acid monomers is also suitable. Dependent on the pH value, the acid group can be deprotonated to be in the form of an anion, which forms with a cationic counterion a salt. The cationic counterion is for example a sodium ion, a potassium ion, a magnesium ion, a calcium ion, ammonium or an alkylated ammonium. Dependent on the pH value, an acid monomer, which possesses at least two acid groups, which structurally allows a cyclic anhydride form, can be in its cyclic form. This is for example the case at maleic acid, itaconic acid or aconitic acid. Preferably, the acid group is a carboxylic acid group. Preferred is an α,β-ethylenically unsaturated $C_3$-$C_6$ carboxylic acid, in particular acrylic acid, methacrylic acid or itaconic acid, very particular acrylic acid or methacrylic acid.

Preferred is a use, wherein the aqueous dispersion of the copolymer P is obtainable by radically initiated emulsion polymerization, wherein
(iii) the acidic monomer is an α,β-ethylenically unsaturated $C_3$-$C_6$ carboxylic acid.

Preferably, the amount of the acidic monomer is from 1 to 5 parts by weight, wherein the sum total of the parts by weight of the monomers (i), (ii), (iii), (iv), (v) and (vi) is always 100. In particular, the amount of the acidic monomer is from 2 to 5 parts by weight, very particular from 3 to 4.5 parts by weight.

Preferably, the amount of acrylonitrile is 0 to 10 parts by weight, wherein the sum total of the parts by weight of the monomers (i), (ii), (iii), (iv), (v) and (vi) is always 100. In particular, the amount of acrylonitrile is 0 to 5 parts by weight, especially 0 part by weight.

Preferred is a use, wherein the aqueous dispersion of the copolymer P is obtainable by radically initiated emulsion polymerization comprising
(iv) 0 part by weight of acrylonitrile.

The acrylate monomer, which is a $C_1$-$C_{18}$ alkyl acrylate or a $C_1$-$C_{18}$ alkyl methacrylate, is for example in regard the $C_1$-$C_{18}$ alkyl linear or branched and the $C_1$-$C_{18}$ alkyl is for example methyl, ethyl, n-propyl, 1-methyl-ethyl, n-butyl, 1-methyl-propyl, 2-methylpropyl, 1,1-dimethyl-ethyl, n-pentyl, 1-methyl-butyl, 3-methyl-butyl, n-hexyl, 1-methylpentyl, 2-methyl-pentyl, 4-methyl-pentyl, 2-ethyl-butyl, n-heptyl, 1-methyl-hexyl, n-octyl, 1-methyl-heptyl, 2-ethylhexyl, 5,5-dimethyl-hexyl, 1,1,3,3-tetramethyl-butyl, n-nonyl, 2-ethyl-heptyl, n-decyl, undecyl, n-dodecyl, tridecyl, tetradecyl, pentadecyl, n-hexadecyl or n-octadecyl. A mixture of acrylate monomers is also suitable. Preferred is $C_1$-$C_{12}$ alkyl, in particular $C_1$-$C_8$ alkyl, very particular $C_1$-$C_4$ alkyl and especially methyl, ethyl or n-butyl.

Preferably, the amount of the acrylate monomer is 0 to 3 parts by weight, in particular 0 to 1.5 parts by weight, wherein the sum total of the parts by weight of the monomers (i), (ii), (iii), (iv), (v) and (vi) is always 100

Preferred is a use, wherein the aqueous dispersion of the copolymer P is obtainable by radically initiated emulsion polymerization comprising
(v) 0 part by weight of an acrylate monomer.

The further monomer contains an ethylenically unsaturated group and is different to styrene, butadiene, the acidic monomer, acrylonitrile and the acrylate monomer. Accordingly, the further monomer is different to each one out of the monomers (i), (ii), (iii), (iv) and (v). The further monomer is for example a vinylaromatic compound different to styrene such as methylstyrene, an ethylenically unsaturated carboxamide such as acrylamide or methacrylamide, an ethylenically unsaturated carbonitrile different to acrylonitrile such as methacrylonitrile, a vinyl ester of a saturated $C_1$-$C_{18}$-carboxylic acid such as vinyl acetate, a cycloalkyl acrylate, a cycloalkyl methacrylate, an allyl ester of a saturated carboxylic acid, a vinyl ether, a vinyl ketone, a dialkyl ester of an ethylenically unsaturated dicarboxylic acid, N-vinylpyrrolidone, N-vinylpyrrolidine, N-vinylformamide, a N,N-dialkylaminoalkylacrylamide, a N,N-dialkylaminoalkylmethacrylamide, a N,N-dialkylaminoalkyl acrylate, a N,N-dialkylaminoalkyl methacrylate, ureido methacrylate, ureido acrylate, glycidyl acrylate, glycidyl methacrylate, vinyl chloride, vinylidene chloride, an alkene such as ethylene or propylene including a conjugated aliphatic diene different to butadiene such as isoprene, or a cycloalkene such as cyclohexene including a conjugated aliphatic cyclodiene such as cyclopentadiene. The further monomer is also for example a crosslinking monomer, which contains at least two non-conjugated ethylenically unsaturated groups. Such a crosslinking monomer is for example an alkanediol diacrylate like butanediol diacrylate, a polyethylene glycol diacrylate, an alkane triol triacrylate, pentaerythritol tetraacrylate, allyl acrylate or allyl methacrylate, a divinylbenzene, 2,4,6-triallyloxy-1,3,5-triazine, methylene bis(acrylamide) [=N-[(prop-2-enoylamino)methyl]prop-2-enamide] or methylene bis(methacrylamide). The further monomer contains preferably one ethylenically unsaturated group or two ethylenically unsaturated groups, which are conjugated. Preferred is methylstyrene, an ester of vinyl alcohol and a $C_1$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, an ethylenically unsaturated $C_4$-$C_8$-monocarbonitrile, an ethylenically unsaturated $C_4$-$C_8$-dicarbonitrile, an ethylenically unsaturated $C_3$-$C_8$ monocarboxamide, an ethylenically unsaturated $C_4$-$C_8$ dicarboxamide, ureido methacrylate, ureido acrylate, glycidyl acrylate, glycidyl methacrylate, alkene, a cycloalkane or a conjugated aliphatic $C_4$-$C_9$ diene.

Preferably, the further monomer is also different to a conjugated aliphatic $C_4$-$C_9$ diene, in particular a conjugated aliphatic diene.

Preferably, the further monomer is also different to an acrylic acid ester or a methacrylic acid ester, in particular to an acrylic acid ester, an methacrylic acid ester, an acrylic acid amide or a methacrylic acid amide.

Preferably, the amount of the further monomer is from 0 to 5 parts by weight, wherein the sum total of the parts by weight of the monomers (i), (ii), (iii), (iv), (v) and (vi) is always 100. In particular, the amount of the further monomer is from 0 to 3 parts by weight, very particular from 0 to 1 part by weight and especially 0 part by weight.

Preferred is a use, wherein the aqueous dispersion of the copolymer P is obtainable by radically initiated emulsion polymerization comprising
(vi) 0 to 5 parts by weight of the further monomer, preferably 0 part by weight.

Preferred is a use, wherein the aqueous coating mass contains an aqueous dispersion of a copolymer P, which is obtainable by radically initiated emulsion polymerization of
(i) at least 40 parts by weight of styrene
(ii) 22 to 49 parts by weight of butadiene
(iii) 1 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

Preferred is a use, wherein the aqueous coating mass contains an aqueous dispersion of a copolymer P, which is obtainable by radically initiated emulsion polymerization of
(i) at least 45 parts by weight of styrene
(ii) 30 to 45 parts by weight of butadiene
(iii) 0 to 5 parts by weight of an acidic monomer, which contains one ethylenically unsaturated group and at least one acid group (iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

Preferred is a use, wherein the aqueous coating mass contains an aqueous dispersion of a copolymer P, which is obtainable by radically initiated emulsion polymerization of
(i) at least 40 parts by weight of styrene
(ii) 30 to 45 parts by weight of butadiene
(iii) 1 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

Preferred is a use, wherein the aqueous coating mass contains an aqueous dispersion of a copolymer P, which is obtainable by radically initiated emulsion polymerization of
(i) at least 40 parts by weight of styrene
(ii) 30 to 45 parts by weight of butadiene
(iii) 0 to 5 parts by weight of an acidic monomer, which contains one ethylenically unsaturated group and at least one acid group
(iv) 0 to 20 parts by weight of acrylonitrile
(v) 0 part by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

Preferred is a use, wherein the aqueous coating mass contains an aqueous dispersion of a copolymer P, which is obtainable by radically initiated emulsion polymerization of
(i) at least 40 parts by weight of styrene
(ii) 30 to 45 parts by weight of butadiene
(iii) 1 to 5 parts by weight of an acidic monomer, which contains one ethylenically unsaturated group and at least one acid group
(iv) 0 to 20 parts by weight of acrylonitrile
(v) 0 part by weight of an acrylate monomer, which is a $C_1$-$C_{18}$ alkyl acrylate or a $C_1$-$C_{18}$ alkyl methacrylate
(vi) 0 to 3 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

Preferred is a use, wherein the aqueous coating mass contains an aqueous dispersion of a copolymer P, which is obtainable by radically initiated emulsion polymerization of
(i) at least 40 parts by weight of styrene
(ii) 30 to 45 parts by weight of butadiene
(iii) 0 to 5 parts by weight of an acidic monomer, which contains one ethylenically unsaturated group and at least one acid group
(iv) 0 to 10 parts by weight of acrylonitrile
(v) 0 part by weight of an acrylate monomer, which is a $C_1$-$C_{18}$ alkyl acrylate or a $C_1$-$C_{18}$ alkyl methacrylate
(vi) 0 to 3 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100.

The aqueous coating mass comprises optionally a further saccharide, which is added after the polymerization of the monomers (i), (ii), (iii), (iv), (v) and (vi). A further saccharide is for example a native starch, a second degraded starch, which can chemically be similar to the first degraded starch, a chemically modified starch, which is not degraded, a cellulose, a hemicellulose, a xyloglucane, carrageen, chitosan, chitin or arabic gum. A native starch's main component is amylopectin. Amylose is in many native starches a relevant further component. Of interest is also a native starch which has a high amylopectin content and a low amylose content such as wax maize starch and wax potato starch. A high amylopectin content is above 90% by weight, in particular in the range from 95 to 100% by weight. In regard to a chemically modified starch, which is not degraded, reference is made to the description at the first degraded starch, i.e. chemical modification herein is differentiated from degradation by meaning a chemical modification, which targets the covalent addition of a chemical group to the starch. A specific form of cellulose is microcrystalline cellulose, which is obtainable by a mild hydrolysis of cellulose. A hemicellulose, also called polyose, is for example guar gum or another galactomannan. Preferably, the further saccharide saccharide is free of a nitrogen atom and a sulfur atom, which are covalently bounded to the further saccharide, and is free of a phosphorus atom, which is covalently bounded to the further saccharide, except that a phosphorus atom being part of a phosphate group can be present. Very preferably, the further saccharide is a native starch, a second degraded starch, which can chemically be similar to the first degraded starch, a chemically modified starch, a cellulose, a hemicellulose or a xyloglucane. In particular, the further saccharide is a native starch, a second degraded starch, which can chemically be similar to the first degraded starch, a cellulose, a hemicellulose or a xyloglucane. Very particular, the further saccharide is a native starch or a second degraded starch, which is a maltodextrin or a corn syrup. Especially, the further saccharide is a maltodextrin or a corn syrup, very especially a maltodextrin.

Preferred is a use, wherein the coating mass comprises in addition to the first degraded starch a further saccharide, which is added after the polymerization of the monomers (i), (ii), (iii), (iv), (v) and (vi).

Preferred is a use, wherein the further saccharide is a native starch, a second degraded starch, which can chemically be similar to the first degraded starch, a chemically modified starch, a cellulose, a hemicellulose or a xyloglucane.

Preferred is a use, wherein the further saccharide is a native starch, a second degraded starch, which can chemically be similar to the first degraded starch, a cellulose, a hemicellulose or a xyloglucane.

The amount of the further saccharide is for example in the range of 21 to 720 parts by weight based on the sum total parts by weight of the monomers (i), (ii), (iii), (iv), (v) and (vi). In particular the further saccharide is in the range of 34 to 540 parts by weight, very particular in the range of 40 to 400 parts by weight and especially in the range of 120 to 300 parts by weight.

Preferred is a use, wherein the amount of the further saccharide is in the range of 21 to 720 parts by weight based on the sum total parts by weight of the monomers (i), (ii), (iii), (iv), (v) and (vi).

A preferred technical feature is a weight ratio of the sum of the monomers (i), (ii), (iii), (iv), (v) and (vi) and the amount of the first degraded starch to the further saccharide. For example, if the sum of the monomers is 100 parts by weight, the first degraded starch is 30 parts by weight and the further saccharide is 260 parts by weight, the weight ratio is 0.5. Preferably, the weight ratio of the sum of the monomers (i), (ii), (iii), (iv), (v) and (vi) and the amount of the first degraded starch to the further saccharide is from 5 to 0.25, in particular from 4 to 0.25, very particular from 3 to 0.33, especially from below 3 to above 0.34 and very especially from 2 to 0.5.

Preferred is a use, wherein the weight ratio of the sum of the monomers (i), (ii), (iii), (iv), (v) and (vi) and the amount of the first degraded starch to the further saccharide is from 5 to 0.25.

The aqueous coating mass contains the aqueous dispersion of the copolymer P, optionally the further saccharide and optionally further water. The aqueous coating mass can contain an auxiliary ingredient, which is different to the copolymer P or the further saccharide. A mixture of auxiliary ingredients is also suitable.

An auxiliary ingredient is for example is for example an inorganic pigment, an organic pigment, which is free of a strong absorption at a wavelength between 400 nm and 800 nm, a thickener, a polymeric binder which is different to the copolymer P or the further saccharide, an optical brightener, a flow control agent, a further dispersing auxiliary, a surfactant, a lubricant, a further neutralizing agent, a defoamer, a deaerator, a preservative or a dye. An inorganic pigment is for example a metal salt, in particular a calcium sulfate, a barium sulfate, a magnesium carbonate, a calcium carbonate, an aluminate, a silicate, an aluminum oxide, a titanium dioxide, a zinc oxide, a zinc sulfide, a silicon dioxide or an argillaceous earth, which is different to the aforementioned substances. A mixture of inorganic pigments is also suitable. Preferably, the inorganic pigment is platelet-shaped. An example of a platelet-shaped inorganic pigment is talc, clay or mica. Mica is a specific class of phyllosilicates, which comprises muscovite, paragonite, phlogopite, biotite, lepidolite or margarite. Talc is preferred. Preferred aspect ratios (ratio of length to thickness) are above 2, in particular above 5 and very particular above 10. Preferably, the amount of the inorganic pigment is from 0 to 35 parts by weight based on the sum total of the parts by weight of the monomers (i), (ii), (iii), (iv), (v) and (vi). In particular, the amount of the inorganic pigment is from 0 to 20 parts and very particular from 0 to 10 parts. A thickener is for example a cross-linked polyacrylate or a cellulose derivative such as carboxymethylcellulose. A polymeric binder can be an emulsion polymer. An emulsion polymer is for example a copolymer of styrene and butadiene or a copolymer of styrene and an acrylate, which is different to the copolymer P. An optical brightener is for example a stilbene derivative, in particular a di-, tetra- or hexasulfonate bistriazinyl-substituted 4,4'-diaminostilbene. A further dispersing auxiliary is for example an emulsifier or a protective colloid as described at the process for preparing an aqueous dispersion of the copolymer P and can be added independently from a dispersing auxiliary in the process for preparing an aqueous dispersion of the copolymer P. A lubricant is for example a stearate such as calcium stearate or a wax. A further neutralizing agent is used to adjust the pH value of the paper coating mass as previously mentioned. The further neutralizing agent can be added independently from a neutralizing agent employed in the process for preparing an aqueous dispersion of the copolymer P and is for example sodium hydroxide or ammonium hydroxide. A preservative is for example a further biocide, which can be added independently from a biocide in the process for preparing an aqueous dispersion of the copolymer P. A dye is for example an organic pigment with a strong absorption at a wavelength between 400 nm and 800 nm or a soluble compound with a strong absorption at a wavelength between 400 nm and 800 nm. A preferred dye is a soluble compound or a combination of a soluble dye with an organic pigment.

Preferably, the aqueous coating mass based on its solids content contains a relative low amount of the auxiliary ingredient. In particular, the overall amount by weight of the sum total of the monomers (i), (ii), (iii), (iv), (v) and (vi), the first degraded starch and the further saccharide is at least 85% by weight based on the overall weight of the solids content of the aqueous coating mass. Accordingly, the overall weight of the solids of the coating mass does not comprise the water of the aqueous dispersion of the copolymer P, the optional further water or other water introduced by the auxiliary ingredient. Very particular, the overall amount by weight of the sum total of the monomers (i), (ii), (iii), (iv), (v) and (vi), the first degraded starch and the further saccharide at least 90% by weight, especially at least 95% by weight.

Preferred is a use, wherein the aqueous coating mass contains
  the aqueous dispersion of the copolymer P,
  optionally the further saccharide,
  optionally further water, and
  an auxiliary ingredient,
wherein the overall amount by weight of the sum total of the monomers (i), (ii), (iii), (iv), (v) and (vi), the first degraded starch and the further saccharide is at least 85% by weight based on the overall weight of the solids content of the aqueous coating mass.

Preferred is a use, wherein the aqueous coating mass contains
  the aqueous dispersion of the copolymer P,
  the further saccharide,
  optionally further water, and
  an auxiliary ingredient,
wherein the overall amount by weight of the sum total of the monomers (i), (ii), (iii), (iv), (v) and (vi), the first degraded starch and the further saccharide is at least 85% by weight based on the overall weight of the solids content of the aqueous coating mass.

Preferably, the aqueous coating mass contains an inorganic pigment in an amount of 0 to 15 parts by weight based on the sum total of the parts by weight of the monomers (i), (ii), (iii), (iv), (v) and (vi), in particular 0 to 5 parts by weight, very particular 0 parts by weight.

Preferably, the aqueous coating mass contains an organic pigment, which is free of a strong absorption at a wavelength between 400 nm and 800 nm, in an amount of 0 to 10 parts by weight based on the sum total of the parts by weight of the monomers (i), (ii), (iii), (iv), (v) and (vi), in particular 0 to 5 parts by weight, very particular 0 parts by weight.

Preferably, the aqueous coating mass contains a polymeric binder, which is different to the copolymer P and the further saccharide, in an amount of 0 to 15 parts by weight based on the sum total of the parts by weight of the monomers (i), (ii), (iii), (iv), (v) and (vi), in particular 0 to 5 parts by weight, very particular 0 to 2 parts by weight, especially 0 parts by weight.

Preferably, the aqueous coating mass contains an optical brightener in an amount of 0 to 0.5 parts by weight based on the sum total of the parts by weight of the monomers (i), (ii), (iii), (iv), (v) and (vi), in particular 0 parts by weight.

Preferably, the aqueous coating mass contains a dye, which is soluble or in a pigment form, in an amount of 0 to 1 parts by weight based on the sum total of the parts by weight of the monomers (i), (ii), (iii), (iv), (v) and (vi), in particular 0 parts by weight.

Preferred is a use, wherein the aqueous coating mass contains an auxiliary ingredient in an amount of 0 to 15 parts by weight based on the sum total of the parts by weight of the monomers (i), (ii), (iii), (iv), (v) and (vi), preferably 0 parts by weight.

The paper substrate is for example a plane material produced from plant fibers as the main starting material with a grammage for example up to 600 g/m$^2$. Preferably, the paper substrate is a paper or a cardboard. The expression paper is used typically more for a grammage up to 225 g/m$^2$, whereas the expression cardboard is used typically more for a grammage above 150 g/m$^2$. The lower limit of the grammage is for example 5 g/m$^2$, in particular 20 g/m$^2$. The paper surface or the cardboard surface can be uncoated or coated. The coating layer can be the sole coat, i.e. the paper substrate is not pre-coated or afterwards top-coated. The paper substrate can be precoated, i.e. the aqueous coating mass leads to a further coating layer. Preferably, the paper substrate is uncoated or pre-coated and is coated by the process only once. Preferably, the paper substrate is uncoated or pre-coated, is coated by the process only once and no further coating layer is generated. Preferably, the paper substrate is uncoated or the paper substrate possesses a precoat, which is obtainable by applying an aqueous coating slip comprising 100 parts by weight of inorganic pigment and 3 to 20 parts by weight of a polymer in an amount of 2 to 10 g based on the solids content of the aqueous coating slip per square meter of the paper substrate, followed by drying to obtain the precoat on the paper substrate. Preferably, the coated paper substrate contains one coating layer or two coating layers, wherein one coating layer is the coating layer on the paper substrate obtainable by the process, which comprises the steps of
(a) providing a paper substrate with a surface,
(b) applying onto the surface of the provided paper substrate an aqueous coating mass, and
(c) drying of the paper substrate with the applied aqueous coating mass to obtain the coated paper substrate,
wherein the aqueous coating mass contains an aqueous dispersion of the copolymer P.

In particular, the other coating layer of the two coating layers is the precoat.

Preferably, the paper substrate is free of a layer of extruded thermoplastic polymers comprising ethylene or propylene as monomers. In particular, the paper substrate is free of a layer of polymers comprising ethylene or propylene as monomers. Very particular, the paper substrate is free of a layer of a polymer, which is a polyolefin, a polyamide or a polyester. Especially, the paper substrate is free of a layer of a polymer, which is a polyolefin, a polyamide, a polyester, a poly(vinyl alcohol) or a poly(vinyl acetate).

Preferred is a use, wherein the paper substrate is a paper or a cardboard.

The coated paper substrate is preferably employed as a construction material for a container suitable for packaging. A container suitable for packaging is for example a bag or a box. The container suitable for packaging possesses for example an interior room completely surrounded by a wall. The goods to be packed are to be placed in the interior room and are separated by the wall from the environment. The wall itself can be either uniform, i.e. formally consist out of one segment, or divided into two or more segments. Due to its function as packaging, the wall is thin in relation to a diameter of the interior room once the interior room is filled with the goods to be packed. The area of the wall directed to the interior room equals approximately the area of the wall directed away from the interior room due to the thin nature of the wall. At least 45% to 100% of the area of the wall based on the overall area of the wall is a segment, which is the coated paper substrate. Preferably, 85% to 100%, in particular 100% of the area of the wall based on the overall area of the wall is a segment, which is the coated paper substrate.

Preferred is a use, wherein the coated paper substrate is a segment of a wall of a container suitable for packaging, which possesses an interior room completely surrounded by the wall, wherein from 45% to 100% of the area of the wall based on the overall area of the wall is the segment.

The goods, which are foreseen to be packed into the interior room of the container, are for example food products, in particular fruits, vegetables, sausages, meat, chocolate or cereals.

The above described preferences are described for a use. The preferences for the use apply also to the further embodiments of the invention. These are a method for blocking of oxygen transfer through a coated paper substrate, a coated paper substrate and a process for manufacturing a coated paper substrate. For the coated paper substrate and the process for manufacturing a coated paper substrate, the following further limitations apply at least in addition, i.e. that
the first degraded starch is present in an amount of from 5 to 80 parts by weight based on the sum total of the parts by weight of the monomers (i), (ii), (iii), (iv), (v) and (vi),
the aqueous coating mass contains a further saccharide, which is added after the polymerization of the monomers (i), (ii), (iii), (iv), (v) and (vi), and
the weight ratio of the sum of the monomers (i), (ii), (iii), (iv), (v) and (vi) and the first degraded starch to the further saccharide is from 5 to 0.25.

A further embodiment of the invention is a method for blocking oxygen transfer through a coated paper substrate, which method comprises
carrying out blocking of oxygen transfer with a coating layer on a paper substrate,
wherein the coating layer on the paper substrate is obtainable by a process, which comprises the steps of
(a) providing a paper substrate with a surface,
(b) applying onto the surface of the provided paper substrate an aqueous coating mass, and
(c) drying of the paper substrate with the applied aqueous coating mass to obtain the coated paper substrate,
wherein the aqueous coating mass contains an aqueous dispersion of a copolymer P, which is obtainable by radically initiated emulsion polymerization of
(i) at least 40 parts by weight of styrene
(ii) 22 to 49 parts by weight of butadiene (iii) 0 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100,
in the presence of a first degraded starch.

A further embodiment of the invention is a coated paper substrate, which possesses a coating layer on a surface of the paper substrate, wherein the coating layer on the surface of the paper substrate is obtainable by a process, which comprises the steps of
(a) providing a paper substrate with a surface,
(b) applying onto the surface of the provided paper substrate an aqueous coating mass, and
(c) drying of the paper substrate with the applied aqueous coating mass to obtain the coated paper substrate,
wherein the aqueous coating mass contains
an aqueous dispersion of a copolymer P, which is obtainable by radically initiated emulsion polymerization of
(i) at least 40 parts by weight of styrene
(ii) 22 to 49 parts by weight of butadiene
(iii) 0 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100,
in the presence of a first degraded starch in an amount of from 5 to 80 parts by weight based on the sum total of the parts by weight of the monomers (i), (ii), (iii), (iv), (v) and (vi), and
a further saccharide, which is added after the polymerization of the monomers (i), (ii), (iii), (iv), (v) and (vi),
wherein the weight ratio of the sum of the monomers (i), (ii), (iii), (iv), (v) and (vi) and the first degraded starch to the further saccharide is from 5 to 0.25.

Preferred is a coated paper substrate, wherein the paper substrate is a paper or a cardboard.

Preferred is a container suitable for packaging, which possesses an interior room completely surrounded by a wall, wherein from 45% to 100% of the area of the wall based on the overall area of the wall is a segment, which is the coated paper substrate.

A further embodiment of the invention is a process for manufacturing a coated paper substrate, which possesses a coating layer on a surface of a paper substrate, which comprises the steps of
(a) providing a paper substrate with a surface,
(b) applying onto the surface of the provided paper substrate an aqueous coating mass, and
(c) drying of the paper substrate with the applied aqueous coating mass to obtain the coated paper substrate,
wherein the aqueous coating mass contains
an aqueous dispersion of a copolymer P, which is obtainable by radically initiated emulsion polymerization of
(i) at least 40 parts by weight of styrene
(ii) 22 to 49 parts by weight of butadiene
(iii) 0 to 5 parts by weight of an acidic monomer, which contains one ethylenically unsaturated group and at least one acid group
(iv) 0 to 20 parts by weight of acrylonitrile
(v) 0 to 5 parts by weight of an acrylate monomer, which is a $C_1$-$C_{18}$ alkyl acrylate or a $C_1$-$C_{18}$ alkyl methacrylate
(vi) 0 to 20 parts by weight of a further monomer, which contains an ethylenically unsaturated group and which is different to styrene, butadiene, the acidic monomer, acrylonitrile or the acrylate monomer,
wherein the sum total of the parts by weight of the monomers (i), (ii), (iii), (iv), (v) and (vi) is always 100,
in the presence of a first degraded starch in an amount of from 5 to 80 parts by weight based on the sum total of the parts by weight of the monomers (i), (ii), (iii), (iv), (v) and (vi), and
a further saccharide, which is added after the polymerization of the monomers (i), (ii), (iii), (iv), (v) and (vi),
wherein the weight ratio of the sum of the monomers (i), (ii), (iii), (iv), (v) and (vi) and the first degraded starch to the further saccharide is from 5 to 0.25.

The invention is illustrated by the non-limiting examples below.

Experimental Part

Unless the context suggests otherwise, percentages are always by weight. A reported content is based on the content in aqueous solution or dispersion if not stated otherwise.

Numerical values for content in the tables are rounded to full numbers if not stated otherwise.

The solids content is measured as the weight obtained when a defined amount, for example 5 g, is dried at 140° C. in a drying cabinet to a constant weight.

The glass transition temperature of the aqueous polymer dispersions is determined by differential scanning calorimetry in analogy to DIN EN ISO 11357-2. A sample is poured out a room temperature and evaporates in laboratory atmosphere overnight. Afterwards, a drying at 120° C. for 1 hour takes place. The DSC apparatus Q2000 from TA Instruments Inc. is run with a program of heating to 150° C., maintaining for 2 minutes, fast cooling to −130° C. and afterwards heating with 20 K/minute. The analysis of Tg occurs in accordance with ISO 11357-2 (half height).

Synthesis of Aqueous Polymer Dispersions
Materials:
AA acrylic acid
BU butadiene ST styrene
MD maltodextrin
SEED polystyrene seed
tDMT tert-dodecyl mercaptan
LABS n-alkyl-($C_{10}$-$C_{13}$) benzene sulfonate, sodium salt
SDS dodecyl sulfate, sodium salt
SPDS peroxodisulfate, sodium salt The used maltodextrin is 'Malto dextrine liquid 1967' (RTM Roquette, an aqueous solution with a content of 70% by weight based on corn starch and dextrin equivalents in the range of 18 to 20, the solution is diluted to 50% by weight prior to use).

The used sodium salt of n-alkyl-($C_{10}$-$C_{13}$) benzene sulfonate is 'Disponil LDBS 20' (RTM BASF, an aqueous solution with a content of 20% by weight).

The used sodium salt of dodecyl sulfate is 'Disponil SDS 15' (RTM BASF, an aqueous solution with a content of 15% by weight).

The other used materials are commercially available for example from Aldrich Inc. or BASF SE.

Examples D-1, D-2 and D-3: Aqueous polymer dispersions No. D1, No. D2 and No. D3

In a 6 L pressure reactor, equipped with an MIG stirrer possessing 3 parallel blades and with 3 metering devices, deionized water (see table 1-A for exact amounts), 41 g of an aqueous dispersion of a polystyrene seed (solids content of 33% parts by weight, an average particle size of 30 nm, 16 parts by weight per 100 parts by weight of styrene of emulsifier Disponil LDBS20) and degraded starch (see table 1-A for amount and type) are initially taken at room temperature and under a nitrogen atmosphere. Thereafter, the reactor content is heated to 90° C. with stirring (180 rpm). As soon as a temperature of 85° C. is reached, 129 g of an aqueous solution of sodium peroxodisulfate (7% by weight based on the aqueous solution) is added. After 10 minutes and simultaneously starting, the total amount of feed 1a and feed 1 b (see table 1-A for ingredients and their exact amounts) is metered in continuously in the course of 360 minutes and feed 2 in the course of 390 minutes at constant flow rates. Feed 2 is 360 g of an aqueous solution of sodium peroxodisulfate (7% by weight based on the aqueous solution). Over the total metering time, the streams of feed 1a and feed 1b are homogenized shortly before entering into the reactor. Thereafter, the reaction is continued for further 2 hours at 90° C. Thereafter, 180 g of deionized water is added and the reactor content is cooled to room temperature. A pH of 6.5 is established with an aqueous solution of sodium hydroxide (15% by weight based on the aqueous solution) and the pressure is lowered to atmospheric pressure. The formed coagulum is separated from the dispersion by filtration over a sieve (mesh size 100 microns).

TABLE 1-A

| ingredients | aqueous dispersion No. D1 [a] | aqueous dispersion No. D2 [b] | aqueous dispersion No. D3 [b] |
| --- | --- | --- | --- |
| initial charge | | | |
| MD [c] [g] | 0 | 1140 | 2280 |
| deionized water [g] | 550 | 620 | 620 |
| feed 1a | | | |
| deionized water [g] | 664 | 664 | 664 |
| SDS [d] [g] | 120 | 12 | 12 |
| AA [g] | 76 | 76 | 76 |

TABLE 1-A-continued

| ingredients | aqueous dispersion No. D1 [a] | aqueous dispersion No. D2 [b] | aqueous dispersion No. D3 [b] |
| --- | --- | --- | --- |
| feed 1b | | | |
| ST [g] | 1083 | 1083 | 1083 |
| tDMT [g] | 21 | 21 | 21 |
| butadiene [g] | 741 | 741 | 741 |

Footnotes:
[a] comparative
[b] according to the invention
[c] aqueous solution of maltodextrin with 50% solids content
[d] aqueous solution of sodium dodecyl sulfate with 15% solids content The obtained aqueous dispersion has a solids content of 50% by weight based on the total weight of the aqueous dispersion. The Tg of the aqueous dispersion No. D1 is 5° C., the Tg of the aqueous dispersion No. D2 is 5° C. and the Tg of the aqueous dispersion No. D3 is 5° C.

Table 1-B summarizes the employed amounts of monomers, other ingredients and radical initiators for the polymer dispersions No. D1 to D3 on a relative weight basis, i.e. parts per hundred parts of monomers. Additionally, the formal solid content less initial MD, the formal solid content of initial MD and the formal solid content of reacted monomers are stated.

TABLE 1-B

| monomer/other ingredient | dispersion No. D1 [a] | dispersion No. D2 [b] | dispersion No. D3 [b] |
| --- | --- | --- | --- |
| AA | 4 | 4 | 4 |
| BU | 39 | 39 | 39 |
| ST | 57 | 57 | 57 |
| initial MD [c] | — | 30 | 60 |
| Seed | 0.7 | 0.7 | 0.7 |
| tDMK | 1.1 | 1.1 | 1.1 |
| SDS | 1.0 | 0.1 | 0.1 |
| SPDS | 0.7 | 0.7 | 0.7 |
| formal solids content less initial MD [d] [%] | 100 | 77 | 63 |
| formal solids content of initial MD [%] | — | 23 | 37 |
| formal solids content of reacted monomers [%] | 97 | 75 | 62 |

Footnotes:
[a] comparative
[b] according to the invention
[c] MD present at beginning of polymerization
[d] relative content of parts other than initial MD based on the solids content of the aqueous dispersion
e) relative content of parts of initial MD based on the solids content of the aqueous dispersion Mixtures of Synthesized Aqueous Polymer Dispersions with Maltodextrin Procedure An aqueous polymer dispersion is mixed with an aqueous solution of maltodextrin (Malto dextrine liquid 1967, RTM Roquette, 50% by weight) by stirring at 23° C. for 30 min with a Pentraulik stirrer at moderate speed (around 300-1000 rpm). In case of alternatives to maltodextrin, a lower solids content of the mixture than 50% by weight of the mixture is possible. The mixtures obtained according to this general procedure are depicted in tables 2-A, 2-B and 2-C.

Tables 2-A, 2-B and 2-C indicate for every mixture the employed ingredients based on their solids content on a relative weight basis, i.e. parts per hundred parts of final solids content of the mixture.

TABLE 2-A

| ingredient | mixture No. | |
| --- | --- | --- |
| | $D1_{0.78}$-$MD_{0.22}$ [a] | $D1_{0.63}$-$MD_{0.37}$ [a] |
| aqueous dispersion No. D1 [c] [%] | 78 | 63 |
| post MD [d] [%] | 22 | 37 |
| solids content of mixture [%] | 50 | 50 |
| formal content of parts of aqueous dispersion No. D1 less initial MD [e] [%] | 78 | 63 |
| initial MD [f] [%] | — | — |
| formal content of parts of reacted monomers of aqueous dispersion No. D1 [g] [%] | 76 | 61 |

Footnotes:
[a] comparative
[b] according to the invention
[c] calculated based on solids content of the aqueous dispersion
[d] MD admixed to the aqueous dispersion after synthesis based on solids content
[e] calculated assuming no initial MD is present during polymerization and based on solids content of mixture
[f] MD present at beginning of polymerization and based on solids content of the mixture
[g] based on solids content of the mixture

TABLE 2-B

| ingredient | mixture No. | |
| --- | --- | --- |
| | $D2_{0.82}$-$MD_{0.18}$ [b] | $D2_{0.65}$-$MD_{0.35}$ [b] |
| aqueous dispersion No. D2 [c] [%] | 82 | 65 |
| post MD [d] [%] | 18 | 35 |
| solids content of mixture [%] | 50 | 50 |
| formal content of parts of aqueous dispersion No. D2 less initial MD [e] [%] | 63 | 50 |
| initial MD [f] [%] | 19 | 15 |
| formal content of parts of reacted monomers of aqueous dispersion No. D2 [g] [%] | 62 | 49 |

Footnotes: compare table 2-A

TABLE 2-C

| ingredient | mixture No. $D3_{0.80}$-$MD_{0.20}$ [b] |
| --- | --- |
| aqueous dispersion No. D3 [c] [%] | 80 |
| post MD [d] [%] | 20 |
| solids content of the mixture [%] | 50 |
| formal content of parts of aqueous dispersion No. D3 less initial MD [e] [%] | 50 |
| initial MD [f] [%] | 30 |
| formal content of parts of reacted monomers of aqueous dispersion No. D3 [g] [%] | 50 |

Footnotes: compare table 2-A

Preparation of Coated Papers

Procedure a) The aqueous polymer dispersion as obtained in the synthetic procedure, the mixture of a synthesized aqueous polymer dispersion with maltodextrin or the other stated coating material is diluted with water in such a way that no streaks from the wire-wound rod are visible when the base paper (Magnostar (RTM Sappi), 70 g/m², precoated with 6 g/m² of a coating mass comprising based on solids parts 70 parts Hydrocarb 60 (RTM Omya, calcium carbonate), 30 parts Hydrocarb 90 (RTM Omya, calcium carbonate) and 5.5 parts Styronal D 809 (RTM BASF, a styrene-butadiene binder), the coating mass having a solids content of 68.5% by weight and being applied with a blade) is coated. The base paper is then placed on the paper underlay of the coating table in portrait format. The wire-wound rod is placed ca. 8 cm from the bottom edge of the paper. A small amount of coating colour is applied to the paper in front of the rod, and applied to the strip of the base paper by pressing the rod down gently with both hands and mowing it at a constant speed across the paper. The strip of paper is then hung up to dry in an oven and dried for 1 min at 130° C.

b) After the paper has been left to cool down, 5×5 cm samples are taken from the uncoated upper edge of the base paper and from the coated area. Both samples are weighed and the coat weight relative to the area is calculated. If the value obtained is lower or higher than the foreseen value, different combinations of pressure, coating speed, choice of wire-wound rod and the dilution of the coating colour can be selected until the desired result is obtained when the procedure is repeated.

c) The coat weight relative to area in g/m² is calculated from the mass of the coated sample less the uncoated sample. The foreseen weight of the applied coat weight is 15 g/m² based on solids content of the aqueous coating mass.

Other employed coating materials are maltodextrin

MD-Glyc a mixture of maltodextrin and glycerin in a weight ratio of 90:10 in the form of an aqueous solution with 22% solids content starch Maltodextrin alone only forms a brittle coating film, which crushes already at bending of the coated paper and thus destroys the coating layer. The added glycerin acts as a softening agent and allows the coated paper to be bended without forming cracks.

The used maltodextrin is 'Malto dextrine liquid 1967' (RTM Roquette, an aqueous solution with a content of 70% by weight based on corn starch and dextrin equivalents in the range of 18 to 20, the solution is diluted to 50% by weight prior to use).

The used starch is 'C*Film 07311' (RTM Cargill, obtained as a powder with 8% humidity content, preparation of an aqueous solution of 30% by weight solids content by calculation via dissolving the powder at 23° C. without lumps, heating the mixture to 90° C. for around 20 minutes and cooling).

Coated papers Pa-1 to Pa-11 with the applied coating mass are depicted in table 3-A.

Physical Properties of Coated Papers

The oxygen permeability is determined according to the test as described below.

Test Equipment for Oxygen Permeability

The test chamber is a stainless steel permeation cell (50 cm$^3$ volume) with an inlet for nitrogen gas, an outlet and a glass window. Oxygen is detected by the fluorescence technology OpTech-O2 (RTM MOCON). OpTech-O2 uses fluorescent chemistries such as the platinum chemistry to measure a rate of decay of the fluorescence. The rate is directly proportional to the concentration of oxygen present. A sensor, which is an adhesive label with a fluorescent colorant, is placed inside the permeation cell behind the glass window. This sensor will fluoresce or give off light in an amount that is directly proportional to the amount of oxygen in the permeation cell. This fluorescence is read by a detector (with LED light) that is placed outside the permeation cell next to the glass window. The measurement does not consume oxygen.

Test Procedure for Oxygen Permeability

The test chamber is a permeation cell and placed in a conditioned room with 23° C. and 50% relative humidity. The permeation cell (100 cm$^3$ volume, round opening with an area of 100 cm$^2$, height of around 7 cm from the bottom to the opening) is covered with the punched out paper sample with a diameter of 14 cm. The opening is accordingly closed by the paper sample, which represents a boundary surface to outside air. The permeation cell is flushed with nitrogen until the platinum-fluorescence detector indicates 0% oxygen. The nitrogen stream is stopped, the inlet and the outlet of the permeation cell are closed and the measuring program is started. Oxygen from outside air can only enter by permeation through the paper sample. The detector reads the fluorescence decay rates at the sensor inside the permeation cell, which are quantitatively influenced in case of the presence of oxygen, in regular intervals and the data are transformed in % oxygen. A paper with a poor oxygen barrier performance leads to a quick increase of oxygen in the permeation cell within a few hours, whereas a paper with good oxygen barrier performance leads to only a small or no increase of oxygen in the permeation cell. Dependent on the performance, the test lasts 12 hours or 24 hours. A program calculates the permeation rate in cm$^3$ oxygen per square meter and per day [oxygen cm$^3$/(m$^2$ d)]. A low value is desired. The data given in table 3-A are the direct test values measured against air with around 20% oxygen content, i.e. without conversion to pure oxygen and without conversion to a specific permeability based on a standardized film thickness.

Table 3-A shows the measured oxygen permeability of an untreated paper, i.e. Pa-0, and the coated papers No. Pa-1 to Pa-11.

TABLE 3-A

| paper No. | applied coating mass [dispersion No., mixture No. or other coating material] | oxygen permeability [cm$^3$ oxygen/(m$^2$ d)] |
|---|---|---|
| Pa-0 [a] | — [a), c)] | >10,000 |
| Pa-1 [a] | D1 [a] | 267 |
| Pa-2 [a] | D1$_{0.78}$-MD$_{0.22}$ [a] | 106 |
| Pa-3 [a] | D1$_{0.63}$-MD$_{0.37}$ [a] | 95 |
| Pa-4 [b] | D2 [b] | 34 |
| Pa-5 [b] | D2$_{0.82}$-MD$_{0.18}$ [b] | 12 |
| Pa-6 [b] | D2$_{0.65}$-MD$_{0.35}$ [b] | 8 |
| Pa-7 [b] | D3 [b] | 10 |
| Pa-8 [b] | D3$_{0.80}$-MD$_{0.20}$ [b] | 3 |
| Pa-9 [a] | MD [a] | >10,000 |
| Pa-10 [a] | MD-Glyc [a] | >10,000 |
| Pa-11 [a] | starch [a] | >10,000 |

Footnotes:
[a)] comparative
[b)] inventive
[c)] no coating material applied

The measured results of the papers Pa-0 to Pa-11 show
(a) that Pa-4 and Pa-7, which are both coated with an emulsion polymer polymerized in the presence of maltodextrin, provide a lower oxygen permeability than Pa-1, which is coated with the respective related emulsion polymer polymerized in the absence of maltodextrin;
(b) that Pa-7, which is coated with an emulsion polymer polymerized in the presence of 60 parts by weight of maltodextrin per 100 parts by weight of monomers, provide a lower oxygen permeability than Pa-4, which is coated with the respective related emulsion polymer polymerized in the presence of 30 parts by weight of maltodextrin per 100 parts by weight of monomers;
(c) that Pa-5 and Pa-6, which are coated with a coating mass with additionally admixed maltodextrin, provide lower oxygen permeability than Pa-4, which is coated without additionally admixed maltodextrin;
(d) that Pa-8, which is coated with a coating mass with additionally admixed maltodextrin, provides lower oxygen permeability than Pa-7, which is coated without additionally admixed maltodextrin;
(e) that Pa-9, Pa-10 and Pa-11, which are coated either with maltodextrin, with a mixture of maltodextrin and glycerin or with starch, provide no measurable reduction of oxygen permeability under the test conditions.

The invention claimed is:

1. A process for manufacturing a coated paper substrate, the process comprising:
  applying onto a surface of a paper substrate an aqueous coating mass; and
  drying of the paper substrate with the applied aqueous coating mass to obtain the coated paper substrate, wherein the coated paper substrate has an oxygen permeability rate of lower than 85 cm$^3$ oxygen per square meter and per day;
  wherein:
    the aqueous coating mass comprises an aqueous dispersion of a polymer P, which is obtainable by radically initiated emulsion polymerization of:
      (i) at least 40 parts by weight of styrene;
      (ii) 22 to 49 parts by weight of butadiene;
      (iii) 0 to 5 parts by weight of an acidic monomer, which contains one ethylenically unsaturated group and at least one acid group;
      (iv) 0 to 20 parts by weight of acrylonitrile;
      (v) 0 to 5 parts by weight of an acrylate monomer, which is a C$_1$-C$_{18}$ alkyl acrylate or a C$_1$-C$_{18}$ alkyl methacrylate;

(vi) 0 to 20 parts by weight of a further monomer, which contains an ethylenically unsaturated group and which is different to the acrylate monomer, styrene, the acidic monomer, or butadiene;

the sum total of the parts by weight of the monomers (i), (ii), (iii), (iv), (v) and (vi) is 100; and in the presence of a first degraded starch in an amount of from 30 to 80 parts by weight based on the sum total of the parts by weight of the monomers (i), (ii), (iii), (iv), (v) and (vi).

2. The process of claim 1, wherein the aqueous mass when dried exhibits a glass transition temperature below 40° C. as determined by the norm ISO 11357-2.

3. The process of claim 1, wherein the aqueous mass further comprises a further saccharide.

4. The process of claim 3, wherein the weight ratio of the sum of the monomers (i), (ii), (iii), (iv), (v) and (vi) and the first degraded starch to the further saccharide is from 5 to 0.25.

5. The process of claim 3, wherein the amount of the further saccharide is from 21 to 720 parts by weight based on the sum total parts by weight of the monomers (i), (ii), (iii), (iv), (v), and (vi).

6. The process of claim 3, wherein the further saccharide is a native starch, a second degraded starch, which can chemically be similar to the first degraded starch, a chemically modified starch, a cellulose, a hemicellulose, or a xyloglucane.

7. A coated paper substrate comprising a paper substrate and a coating layer thereon that is configured to block oxygen transfer through the paper substrate, wherein the coating layer comprises:
  a first degraded starch; and
  a polymer P which is the polymerization product of a radically initiated emulsion in the presence of 30 to 80 parts by weight of the first degraded starch, the emulsion comprising:
    (i) at least 40 parts by weight of styrene;
    (ii) 22 to 49 parts by weight of butadiene;
    (iii) 0 to 5 parts by weight of an acidic monomer, which contains one ethylenically unsaturated group and at least one acid group;
    (iv) 0 to 20 parts by weight of acrylonitrile;
    (v) 0 to 5 parts by weight of an acrylate monomer, which is a $C_1$-$C_{18}$ alkyl acrylate or a $C_1$-$C_{18}$ alkyl methacrylate; and
    (vi) 0 to 20 parts by weight of an ethylenically unsaturated monomer other than styrene, butadiene, the acidic monomer, and acrylate monomer;
  wherein:
    the sum total of the parts by weight of (i), (ii), (iii), (iv), (v) and (vi) is 100; and
    the coated paper substrate has an oxygen permeability rate of lower than 85 $cm^3$ oxygen per square meter and per day.

8. The coated paper substrate of claim 7, wherein the coating layer exhibits a glass transition temperature below 40° C. as determined by the norm ISO 11357-2.

9. The coated paper substrate of claim 7, wherein the coating layer comprises from 5 to 80 parts by weight of the first degraded starch based on the sum total parts by weight of the monomers (i), (ii), (iii), (iv), (v) and (vi).

10. The coated paper substrate of claim 7, wherein the emulsion comprises at least 45 parts by weight of styrene.

11. The coated paper substrate of claim 7, wherein the emulsion comprises 30 to 45 parts by weight of butadiene.

12. The coated paper substrate of claim 7, wherein the acidic monomer is an α,β-ethylenically unsaturated $C_3$-$C_6$ carboxylic acid.

13. The coated paper substrate of claim 7, wherein the emulsion comprises 0 parts by weight of the acrylonitrile, 0 parts by weight of the acrylate monomer, or 0 parts by weight of acrylonitrile and acrylate monomer.

14. The coated paper substrate of claim 7, wherein the emulsion comprises 0 to 5 parts by weight of the further monomer.

15. The coated paper substrate of claim 7, wherein the coating layer further comprises an auxiliary ingredient in an amount of 0 to 15 parts by weight based on the sum total of the parts by weight of the monomers (i), (ii), (iii), (iv), (v) and (vi).

16. The coated paper substrate of claim 7, wherein the paper substrate is a paper or a cardboard.

17. The coated paper substrate of claim 7, wherein the coated paper substrate is a segment of a wall of a container suitable for packaging which possesses an interior room completely surrounded by the wall, wherein from 45% to 100% of the area of the wall based on the overall area of the wall is the segment.

18. The coated paper substrate of claim 7, wherein the aqueous dispersion further comprises a further saccharide which is added after the polymerization of the monomers (i), (ii), (iii), (iv), (v), and (vi).

19. The coated paper substrate of claim 18, wherein the amount of the further saccharide is from 21 to 720 parts by weight based on the sum total parts by weight of the monomers (i), (ii), (iii), (iv), (v), and (vi).

20. The coated paper substrate of claim 18, wherein the weight ratio of the sum of the monomers (i), (ii), (iii), (iv), (v), and (vi) and the amount of the first degraded starch to the amount of the further saccharide is from 5 to 0.25.

21. The coated paper substrate of claim 18, wherein the further saccharide is a native starch, a second degraded starch, which can chemically be similar to the first degraded starch, a chemically modified starch, a cellulose, a hemicellulose, or a xyloglucane.

* * * * *